US008556694B2

(12) United States Patent
Watanabe

(10) Patent No.: US 8,556,694 B2
(45) Date of Patent: Oct. 15, 2013

(54) NETWORK GAME SYSTEM, A NETWORK GAME TERMINAL, A METHOD OF DISPLAYING A GAME SCREEN, A COMPUTER PROGRAM PRODUCT AND A STORAGE MEDIUM

(75) Inventor: Noriaki Watanabe, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 1057 days.

(21) Appl. No.: 11/928,834

(22) Filed: Oct. 30, 2007

(65) Prior Publication Data

US 2008/0254882 A1    Oct. 16, 2008

(30) Foreign Application Priority Data

Oct. 31, 2006  (JP) ................. 2006-297018

(51) Int. Cl.
  A63F 9/24   (2006.01)
  A63F 13/00  (2006.01)
  G06F 17/00  (2006.01)
  G06F 19/00  (2011.01)

(52) U.S. Cl.
  USPC ........................................ 463/8; 463/5; 463/7

(58) Field of Classification Search
  USPC .......................................................... 463/8
  See application file for complete search history.

(56) References Cited

U.S. PATENT DOCUMENTS

| 2003/0069053 A1 | 4/2003 | Dovgan |
| 2003/0134678 A1 | 7/2003 | Tanaka |
| 2003/0216184 A1 | 11/2003 | Kigoshi |
| 2003/0228909 A1 | 12/2003 | Tanaka et al. |
| 2005/0108352 A1 | 5/2005 | Kashitani et al. |
| 2006/0046810 A1 | 3/2006 | Tabata |

FOREIGN PATENT DOCUMENTS

| EP | 1452213 | 9/2004 |
| JP | 6-105959 | 4/1994 |
| JP | 8-280933 A | 10/1996 |
| JP | 10-113466 | 5/1998 |
| JP | 11-300044 | 11/1999 |
| JP | 2000-024313 A | 1/2000 |

(Continued)

OTHER PUBLICATIONS

Final Fantasy XI—Wikipedia Entry, [online], May 16, 2002, <http://en.wikipedia.org/wiki/Final_Fantasy_XI>, retrieved Mar. 16, 2011.*

(Continued)

*Primary Examiner* — Melba Bumgarner
*Assistant Examiner* — Jason Pinheiro
(74) *Attorney, Agent, or Firm* — Greenblum & Bernstein

(57) ABSTRACT

A terminal apparatus is connected to a server apparatus via a network. Active character information capable of specifying an active character is transmitted to the server apparatus. A movement instruction used to move the active character in a virtual space is inputted. Movement information is transmitted to the server apparatus in accordance with the movement instruction. Visible range information capable of specifying all of the player characters each existing in a visible range is received. A display device displays the visible range in which all of the player characters specified by the visible range information are arranged so that the player character that one player of the terminal apparatus causes to participate in the network game can be distinguished from other player character that another player causes to participate in the network game and so that the player can distinguish the active character from non-active characters.

22 Claims, 13 Drawing Sheets

(56) References Cited

FOREIGN PATENT DOCUMENTS

| | | |
|---|---|---|
| JP | 2000-70550 | 3/2000 |
| JP | 2002-049937 A | 2/2002 |
| JP | 2002-224435 A | 8/2002 |
| JP | 2002-282536 A | 10/2002 |
| JP | 2002-282636 A | 10/2002 |
| JP | 2003-144749 | 5/2003 |
| JP | 2003 325983 | 11/2003 |
| JP | 2004-230179 | 8/2004 |
| JP | 2005-230265 A | 9/2005 |
| JP | 2006-018476 A | 1/2006 |

OTHER PUBLICATIONS

Final Fantasy XII—Wikipedia Entry, [online], Mar. 16, 2006, <http://en.wikipedia.org/wiki/Final_Fantasy_XII>, retrieved Mar. 16, 2011.*

Wikipedia, Age of Empiires II: The Age of Kings, Sep. 30, 2005, <http://en.wikipedia.org/w/index.php?title=Age_of_Empires_II:_The_Age_of_Kings&oldid=24396973>.*

GameFaqs.com, Age of Empiires II: The Age of Kings, Aug. 25, 2005, <http://www.gamefaqs.com/pc/63605-age-of-empires-ii-the-age-of-kings/faqs/38481>.*

English language Abstract of JP 2002-282536 A.

"Capcom Perfect Capture Series 23, BIOHAZARD 0 Perfect Capture Guide," Japan, Capcom Co., Ltd., Jan. 10, 2003, pp. 14-15, and an English language partial translation thereof.

English language Abstract of JP 2003-325983.

SQUARE ENIX, "Final Fantasy XI—wikipedia entry" [Online] May 16, 2002, Sony Computer Entertainment, XP002468068, Retrieved from the Internet: URL:http://en.wikipedia.org/wiki/Final_Fantasy_XI, [retrieved on Feb. 6, 2008].

SQUARE ENIX, "Final Fantasy XII—wikipedia entry" Mar. 16, 2006, SQUARE ENIX, XP002468069, Retrieved from the Internet: URL:http://en.wikipedia.org/wiki/Final_Fantasy_XI, [retrieved on Feb. 6, 2008].

SQUARE ENIX, "Final Fantasy — Game Manual" [Online] Mar. 16, 2006, SQUARE ENIX, XP002468070 Retrieved from the Internet: URL:http://www.replacementdocs.com/download.php?view.4620, [retrieved on Feb. 6, 2008], pp. 5, 16-29, and 24-33.

Wartell et al., "Third-person navigation of whole-planet terrain in a head-tracked stereoscopic environment," Proceedings of IEEE 1999 Virtual Reality, Houston, TX, Mar. 13-17, 1999, Proceedings of IEEE Virtual Reality, New York, NY, IEEE, US, Mar. 13, 1999, pp. 141-148, XP000887651, ISBN: 0-7803-5559-9.

English language Abstract of JP 10-113466.

English language Abstract of JP 11-300044.

English language Abstract of JP 2000-70550.

English language Abstract of JP 2004-230179.

English language Abstract of JP 2003-144749.

English language Abstract of JP 6-105959.

"ENIX Best Mook Library Star Ocean Till the End of Time Official Guidebook First edition", first impression of the first edition, ENIX Co., Ltd, Mar. 20, 2003, p. 014-019.

"V Jump Books Play Station 2 version Final Fantasy XII First Flight Guide", first impression, Shueisha Inc., Mar. 21, 2006, p. 070-087, 177-179.

Final Fantasy XI Online Vana'diel World Report version.021002, first edition, DigiCube Co., Ltd., Nov. 2002, pp. 064-065, 322.

English language Abstract of JP 2002-049937 A.

English language Abstract of JP 2006-018476 A.

English language Abstract of JP 2002-282636 A.

English language Abstract of JP 2005-230265 A.

English language Abstract of JP 8-280933 A.

English language Abstract of JP 2002-224435 A.

English language Abstract of JP 2000-024313 A.

"Granado Espada Connect! On," Japan, Enterbrain, Inc., Aug. 4, 2006, 2006 Summer vol. 1, pp. 122-123, and an English language partial translation thereof.

"V Jump Books PlayStation 2 edition [edited by SQUARE ENIX] Final Fantasy XII First Flight Guide," Japan, Shueisha Inc., Mar. 21, 2006, First Edition, pp. 70-71, and an English language partial translation thereof.

"Final Fantasy XI Online Vana'diel World Report version 021002," Japan, DigiCube Co., Ltd., Nov. 7, 2002, First Edition, p. 18, and an English language partial translation thereof.

"Nintendo 64, The Legend of Zelda-Ocarina of Time, Capture Guide Book," Japan, T2 Publishing Co., Ltd., Feb. 12, 1999, First Edition, p. 5, and an English language partial translation thereof.

"Let's Start Ragnarok Online!" Japan, Softbank Publishing Co., Ltd., Apr. 11, 2005, First Edition, pp. 12, 15 and 26, and an English language partial translation thereof.

"Dragon Quest V Hand of the Heavenly Bride Official Guide Book vol. 1," Japan, ENIX Co., Ltd., Jan. 1, 1993, First Edition, p. 159, and an English language partial translation thereof.

* cited by examiner

FIG. 6A

Table 400

| PLAYER ID | PW | HANDLE NAME | PLAYER LOGIN FLAG | CHARACTER TABLE ADDRESS |
|---|---|---|---|---|
| ... | ... | ... | ... | ... |
| 1001 | ... | ABCD | 1 | ● → A |
| ... | ... | ... | ... | ... |
| 401 | 402 | 403 | 404 | 405 |

FIG. 6B

Table 500

A →

| CHARACTER ID | NAME | CHARACTER FORM | | CHARACTER POSITION | CHARACTER ORIENTATION | SAVE INFORMATION | ACTIVE FLAG | CHARACTER LOGIN FLAG |
|---|---|---|---|---|---|---|---|---|
| | | OUTLINE | | | | | | |
| 108056 | AAA | ... | | | | | 1 | 1 |
| 108057 | BBB | ... | | | | | 0 | 0 |
| 108058 | CCC | ... | | | | | 0 | 1 |
| 108059 | DDD | ... | | | | | 0 | 0 |
| 501 | 502 | 503 | | 504 | 505 | 506 | 507 | 508 |

FIG. 7

| CHARACTER ID | NAME | CHARACTER FORM | | CHARACTER POSITION | CHARACTER ORIENTATION | SAVE INFORMATION | ACTIVE FLAG | TAB NO. | MARK |
|---|---|---|---|---|---|---|---|---|---|
| | | OUTLINE | ... | | | | | | |
| 108056 | AAA | | ... | | | | 1 | 1 | ● |
| 108057 | BBB | | ... | | | | 0 | | |
| 108058 | CCC | | ... | | | | 0 | 2 | ■ |
| 108059 | DDD | | ... | | | | 0 | | |

600, 601, 602, 603, 604, 605, 606, 607, 608, 609

NETWORK GAME SYSTEM, A NETWORK GAME TERMINAL, A METHOD OF DISPLAYING A GAME SCREEN, A COMPUTER PROGRAM PRODUCT AND A STORAGE MEDIUM

CROSS-REFERENCE TO RELATED APPLICATION

The present disclosure relates to subject matter contained in Japanese Patent Application No. 2006-297018, filed on Oct. 31, 2006, the disclosure of which is expressly incorporated herein by reference in its entirety.

BACKGROUND OF THE INVENTION

1. Field of the Invention

The present invention relates to a technique for execution of a network game in which a player operates a plurality of characters at the same time in one terminal apparatus in a system configured from a server apparatus and a plurality of terminal apparatuses connected to the server apparatus via a network, whereby the network game proceeds.

2. Description of the Related Art

Heretofore, a network game in which a plurality of players participate together is well known in which a plurality of players log in the network game presented in a server apparatus connected to a plurality of terminal apparatuses of the players via a network such as the Internet, and each of the players operates his or her own character in the network game (for example, see Japanese Patent Application Publication No. 2003-325983).

In most network games, one account is assigned to one character in the server apparatus, and each player cannot utilize (or operate) a plurality of characters at the same time. However, there is a play style in which one player possessing a plurality of terminal apparatuses logs in the network game presented in the server apparatus with different accounts from the plurality of terminal apparatuses, and the one player utilizes (or operates) the plurality of characters at the same time.

Most game management operators think that such a play style is a wrong conduct to cause trouble other players and forbids it. For example, since depending on the kind of game such a play style does not necessarily cause trouble other players, some game management operators who permit a variety of play styles may allow such a play style.

Even though the game management operator allows such a play style, there is need for the player to possess a plurality of terminal apparatuses to utilize a plurality of characters at the same time in the case of a conventional network game. Thus, it is hardly to realize such a situation casually. In addition, even though the player logs in the game from the plurality of terminal apparatuses prepared for every account at the same time, the player can recognize the character corresponding to the account for which each terminal apparatus logs in, but the player cannot distinguish his or her own characters other than the character corresponding to the account from the characters of other players in a game space.

Further, for example, the player may log in the game with a plurality of accounts when a plurality of browsers are launched for the accounts even in one terminal apparatus. In this case, the plurality of browsers launched for the respective accounts are substantially similar to the plurality of terminal apparatuses prepared for every account. The player can recognize the character corresponding to the account, but the player cannot distinguish his or her own characters other than the character corresponding to the account from the characters of other players in a game space.

Either in the case where the player logs in a plurality of accounts from a plurality of terminal apparatuses or in the case where the player launches a plurality of browsers for the plurality of accounts to log in with one terminal apparatus, the player may confuse association with the plurality of characters corresponding to the respective accounts when to operate his or her own character other than the character that the player currently operates with the corresponding terminal apparatus or browser.

SUMMARY OF THE INVENTION

It is one object of the present invention to solve the problems described above and to provide a network game system, a network game terminal, a method of displaying a game screen, a computer program product and a storage medium by which a player using one terminal apparatus can cause a plurality of player characters to participate in a network game, in which a plurality of players participate, at the same time without confusion of operations of the player.

In order to achieve the above object, a first aspect of the present invention is directed to a network game system including a server apparatus and a plurality of terminal apparatuses connected to the server apparatus via a network. In this case, each of the plurality of terminal apparatuses allows a plurality of player characters to participate in a network game, and the player characters caused to participate in the network game exist in a common virtual space.

Each of the terminal apparatuses includes an active character selector that selects one player character as an active character whose action is activated among the player characters in accordance with an operation of the player of the terminal apparatus, the player causing the player characters to participate in the network game.

Each of the terminal apparatuses also includes an active character information transmitter that transmits active character information to the server apparatus via the network, the active character information being capable of specifying the active character selected by the active character selector and non-active characters other than the active character.

Each of the terminal apparatuses also includes a movement instruction input controller that inputs a movement instruction in accordance with an operation of the player, the movement instruction being used to move the active character selected by the active character selector in the virtual space.

Each of the terminal apparatuses also includes a movement information transmitter that transmits movement information in accordance with the movement instruction inputted by the movement instruction input controller to the server apparatus via the network.

Each of the terminal apparatuses also includes a visible range information receiver that receives visible range information transmitted from the server apparatus via the network, the visible range information being capable of specifying all, of the player characters each existing in a visible range, the visible range being set to a predetermined range of the virtual space within a range displayed on a display device with which the terminal apparatus is provided, at least the active character currently selected being included in the predetermined range of the virtual space.

Each of the terminal apparatuses also includes a display controller that causes the display device to display the visible range, all of the player characters specified by the visible range information received by the visible range information receiver being arranged in the visible range.

The server apparatus includes an active character information receiver that receives the active character information transmitted by the active character information transmitter of each of the plurality of terminal apparatuses.

The server apparatus also includes an active character manager that manages the player character selected as the active character among the player characters on the basis of the active character information received by the active character information receiver, the player characters being caused to participate in the network game for every player.

The server apparatus also includes a movement information receiver that receives the movement information transmitted by the movement information transmitter.

The server apparatus also includes a character position manager that manages a position of each of all of the player characters caused to participate in the network game in the virtual space on the basis of the movement information transmitted by the movement information transmitter.

The server apparatus also includes a visible range specifier that specifies a visible range for every terminal apparatus, the visible range including the position managed by the character position manager for the active character managed by the active character manager.

The server apparatus also includes a visible range information transmitter that transmits the visible range information to each of the terminal apparatuses via the network, in the visible range information all of the player characters included in the visible range specified for every terminal apparatus by the visible range specifier being extracted in accordance with the positions managed by the character position manager and all of the player character thus extracted being capable of being specified.

In this case, the display controller causes the display device to display the visible range in which all of the player characters specified by the visible range information are arranged so that the player character that one player of the terminal apparatus causes to participate in the network game can be distinguished from other player character that another player causes to participate in the network game and so that the player of the terminal apparatus can distinguish the active character from the non-active characters among the player characters that the player causes to participate in the network game.

In the network game system described above, one player utilizing the terminal apparatus can cause a plurality of player characters to participate in the game. Thus, a plurality of player characters caused to participate in the game by a plurality of players exist in the virtual space. The player can select arbitrary one of the player characters caused to participate in the game as the active character during the game. The player can switch the active character between the plurality of player characters caused to participate in the game in one terminal apparatus to operate the active character.

Here, the visible range that is a range displayed on the display device is set to a predetermined range including at least the active character in the virtual space. In the visible range, the player characters of the player who causes to participate in the game and the player characters of other player may exist together. In the display device, all of the player characters included in the field of view range including the position of the active character are displayed so that the player can distinguish between the player character that other player causes to participate in the game, the active character, or the non-active character. Thus, even in the virtual space in which the plurality of player characters exist together, the player can distinguish the active character that can be moved in the virtual space by an operation of the player from other player characters. This makes it possible for the game to proceed smoothly.

In this regard, in the network game system described above, the word "distinguishably display" the player character does not mean that each of the player characters is distinguishably displayed with the difference of a unique form. It means that by means of the difference other than the unique form, the active character and the non-active character, and the player character that other player causes to participate in the game are distinguishably displayed while permitting the difference of the unique form for the player characters (however, this does not exclude the possibility that a plurality of player characters each having the identical form exist). As a technique to distinguishably display these by means of the difference other than the unique form, the difference of the display positions on the display device, presence or absence of additional information and the difference of appearance displayed so as to be added to the player characters, or the display state of the player characters (display color, transparency and the like) can be applied.

In the network game system describe above, it is preferable that the display controller causes the display device to display the active character among the player characters that the player causes to participate in the network game in the center of a display screen of the display device so that the active player character, can be distinguished from the non-active characters on the basis of the difference of display positions on the display screen.

In this case, the active character that the player can move by his or her operation is displayed in the center of the display device, which is a position that the player can view easily. By distinguishing the active character from the non-active character by means of the difference of the display position on the display device, the player can cause the game to proceed smoothly without confusion of the active character to be operated. In particular, by displaying the active character in the center of the display device, the player readily recognizes the active character, and this makes it possible to improve operability further.

In this case, it is preferable that the virtual space is a virtual three-dimensional space, the display controller includes a perspective transformer that generates a two-dimensional image by projecting the player characters each existing in the virtual three-dimensional space onto a virtual screen by means of a virtual camera while directing a visual axis of the virtual camera to the active character selected by the active character selector, a viewpoint of the virtual camera is positioned at a predetermined position of the virtual three-dimensional space, and the display controller causes the display device to display the two-dimensional image generated by the perspective transformer, and the visible range is a range projected onto the virtual screen in the virtual three-dimensional space by means of the perspective transformer.

In this case, since the direction of the visual axis of the virtual camera always faces the active character, the active character can be displayed in the center of the display device.

In this case, it is preferable that the position of the viewpoint of the virtual camera is uniquely determined in accordance with the movement of the active character in the virtual three-dimensional space.

In this case, the position of the viewpoint of the virtual camera follows the movement of the active character in the virtual three-dimensional space. The player can always recognize the active character with the equivalent visibility.

In the network game system describe above, it is preferable that the virtual space is a virtual three-dimensional space, the display controller includes a perspective transformer that generates a two-dimensional image by projecting the other player characters existing in the virtual three-dimensional space onto a virtual screen by means of a virtual camera, a viewpoint of the virtual camera is positioned at a position of an eye of the active character in the virtual three-dimensional space, and the display controller causes the display device to display the two-dimensional image generated by the perspective transformer and to display a part of the active character in accordance with a direction of a visual axis, and the visible range is a range projected onto the virtual screen in the virtual three-dimensional space by means of the perspective transformer.

In thins case, the viewpoint of the virtual camera is uniquely determined at the position of eyes of the active character, and the direction of the visual axis is determined to the direction of the face of the active character, and the area of the field of view is fixed. Here, the virtual three-dimensional space viewed from the active character is displayed on the display device. The player can improve realism (realistic sensation) of the game. Further, since a part of the active character is displayed on the display device in accordance with the action of the active character, the player can cause the game to proceed with the viewpoint of the active character while grasping the active character to be operated by the player.

In the network game system describe above, it is preferable that each of the player characters is configured by a combination of parts, and the parts are respectively selected for sites from a plurality of parts prepared for the sites.

In this case, the difference of the configuration of the player characters occurs only due to the combination of selected tools for the respective sites. There is a possibility that the player characters having a very similar configuration or identical configuration (according to the circumstances) exist in the common virtual space in which all of the player characters caused to participate in the game exist. Even in the case where the player characters having a very similar configuration (or identical configuration) exist in the virtual, space, the player character that other player causes to participate in the game, the active character, and the non-active character are distinguishably displayed on the display device. The player can distinguish the active character from other player characters, whereby the player can cause the game to proceed.

In the network game system describe above, it is preferable that each of the plurality of terminal apparatuses further includes a position map display controller that causes the display device to display a character position map, and the character position map indicates a position of each of the player characters, which the player of the terminal apparatus causes to participate in the network game, in a range of the virtual space wider than the visible range.

In this case, it is preferable that each of the plurality of terminal apparatuses further includes a position map display selector that selects whether the position map display controller causes the display device to display the character position map or not in accordance with an operation of the player.

In this case, in the case where the player causes the plurality of player characters to participates in the game, the character position map indicates the positions corresponding to the respective player characters in the virtual space. Here, on the basis of the position of player character in the virtual space displayed in the character position map, the player easily grasp the positional relationship of the respective player characters. In addition, by selecting whether or not the character position map is to be displayed by an operation of the player, it is possible to prevent visibility of the visible range displayed on the display device from lowering.

In the network game system describe above, it is preferable that each of the plurality of terminal apparatuses further includes a terminal character, manager that manages the player characters, which the player of the terminal apparatus causes to participate in the network game, so as to be capable of distinguishing the active character from the non-active characters, and the display controller specifies whether or not each of the player characters specified by the visible range information is the player character that the player of the terminal apparatus causes to participate in the network game or not on the basis of information managed by the terminal character manager, specifies whether each of the player characters is the active character or the non-active character, and causes the display device to display the player characters that the player causes to participate in the network game so that the player characters that the player of the terminal apparatus causes to participate in the network game can be distinguished from the player characters that another player causes to participate in the network game and so that the active player character can be distinguished from the non-active characters.

In this case, the server apparatus can specify the visible range information without specifying whether each of all of the player characters included in the visible range is any player character (the active character, the non-active character, or the player character of other player). This makes it possible reduce a processing load for the visible range information specifying each of the terminal apparatuses.

Further, in the network game system describe above, it is preferable that in the visible range information it can be specified whether each of the player characters existing in the visible range is the player characters that the player of the terminal apparatus causes to participate in the network game or not, and whether each of the player characters that the player causes to participate in the network game is the active character or the non-active character, and the display controller specifies whether or not each of the player characters included in the visible range information is the player character that the player of the terminal apparatus causes to participate in the network game or not on the basis of the visible range information, specifies whether each of the player characters is the active character or the non-active character, and causes the display device to display the player characters that the player causes to participate in the network game so that the player characters that the player of the terminal apparatus causes to participate in the network game can be distinguished from the player characters that another player causes to participate in the network game and so that the active player character can be distinguished from the non-active characters.

In this case, the server apparatus specifies the visible range information in which whether each of all of the player characters included in the visible range is any player character (the active character, the non-active character, or the player character of other player) is specified, whereby it is possible to prevent an iniquity process from being executed by each of the terminal apparatuses.

In the network game system describe above, it is preferable that the active character selector includes a display position input controller that inputs the position on a display screen of the display device in accordance with an operation of the player, and selects the player character displayed at the inputted position as the active character when the player character that the player causes to participate in the network game exists at the position on the display screen inputted by the display position input controller.

Further, in the case where each of the plurality of terminal apparatuses includes the position map display controller, the active character selector can select the player character displayed at the inputted position as the active character when the position of the player character that the player causes to participate in the game is shown at the position on the display device inputted by the display position input controller within the character position map.

Here, in the case where the active character and the non-active character are displayed on the display device (or in the character position map) the player can set the non-active character to a new active character by inputting the display position of the non-active character. Thus, since the player can select the active character that is an operational target by means of a direct input, it is possible to improve operability.

In the network game system describe above, it is preferable that the character position manager includes a following movement controller that causes the non-active characters each having a predetermined relationship with the active character to move in the virtual space so as to follow the movement of the active character when the active character is caused to move in the virtual space in accordance with the movement information received by the movement information receiver.

In this case, the non-active character having a predetermined relationship with the active character moves so as to follow the movement of the active character without the player character of the player or other player. Here, one player operates the active character, whereby all of the non-active characters each having a predetermined relationship with the active character can be moved in the virtual space.

In this case, it is preferable that the non-active characters that are caused to move so as to follow the movement of the active character by means of the following movement controller include non-active characters of other players than the player of the active character.

In this case, only in the case where the player character is the non-active character, the player character having a predetermined relationship with the active character of other player moves in the virtual space so as to follow the movement of the active character of other player. Here, the player can move the player character whose action is not activated by the player in the virtual space without an operation of the player.

In the network game system describe above, it is preferable that each of the plurality of terminal apparatuses further includes a participation character selector that selects a player character to be actually caused to participate in the network game from a plurality of player characters that the player of the terminal apparatus can cause to participate in the network game in accordance with an operation of the player, the active character selector selects one active character from the player characters selected as ones to be caused to participate in the network game by the participation character selector, and the active character information transmitter transmits the active character information capable of specifying the active character and the non-active characters among the player characters selected as ones to be caused to participate in the network game by the participation character selector.

In this case, the player can select the player characters caused to participate in the game by an operation of the player, and one player character is selected from the selected player characters as the active character. Thus, since the number of player characters caused to participate in the game can be arbitrarily determined by the player, it is possible to improve flexibility of the game.

In this case, it is preferable that the participation character selector in turn selects a player character to be actually caused to participate in the network game one by one from the plurality of player characters that the player of the terminal apparatus can cause to participate in the network game in accordance with an operation of the player, and when a new player character is selected as a player character to be caused to participate in the network game by the participation character selector, the active character selector selects the player character newly caused to participate in the network game as the active character until another player character is further selected as the active character in accordance with an operation of the player.

Here, the player character finally selected from the player characters caused to participate in the game becomes the active character immediately after participation of the game. Here, the player can readily determine the active character immediately after the participation of the game.

In the networks game system describe above, it is preferable that the server apparatus further includes: a non active action controller that executes a predetermined action against the non-active characters not managed as an active character by the active character manager among the player characters managed by the character position manager; an active character transformer that sets the non-active character subjected to the predetermined action as an active character when the predetermined action is executed against the non-active character by the non-active action controller, sets the active character that the player of the nor-active character subjected to the predetermined action causes to participate in the network game as a non-active character, and causes the active character manager to manage the set active character and an active character transforming information transmitter that transmits active character transforming information to the terminal apparatus of the player who causes the active character newly set to participate in the network game via the network, the active character transforming information being capable of specifying the active character newly set when the new active character is set by the active character transformer. It is preferable that each of the terminal apparatuses further includes: an active character transforming information receiver that receives the active character transforming information transmitted by the active character transforming transmitter, and wherein the display controller causes the display device to distinguishably display the active character and the non-active character among the player characters that the player of the terminal apparatus causes to participate in the network game in accordance with the received active character transforming information when the active character transforming information receiver receives the active character transforming information.

In this case, in the case where a predetermined action is executed against the non-active character, the non-active character is switched to the active character. Here, the display device is caused to display the image in accordance with the visible range of player character subjected to the action. Since the player can grasp the fact that the action is executed, the player can cause the game to proceed smoothly.

In this regard, in the case where the visible range information is the information capable of specifying whether each of the player characters that the player of the terminal apparatus cause to participate in the game is the active character or the non-active character, the active character transforming information can be the visible range information. In this case, the active character transforming information transmitter can be the visible range information transmitter, and the active character transforming information receiver can be visible range information receiver.

In the network game system describe above, it is preferable that a predetermined parameter is set to each of the player characters caused to participate in the network game, and a state of the predetermined parameter is changed in accordance with progress of the network game, and the display controller causes the display device to display the player character that the player of the terminal apparatus causes to participate in the network game so as to attach the predetermined parameter thereto, and to display the player character that other player causes to participate in the network game so as not to attach the predetermined parameter thereto.

In this case, the state of a parameter is changed in accordance with progress of the game. Since each of the players causes the game to proceed while grasping the state of the parameter set to the player character of the player, the player can cause the game to proceed smoothly.

In this case, it is preferable that the network game includes at least a process for executing a battle between the active character and an enemy character other than the active character, and a battle between a new active character and the enemy character is executed in the case where the new active character is newly selected by the active character selector during the battle, and the predetermined parameter is a parameter whose value is increased or decreased in accordance with progress of the battle.

In this case, the value of the parameter set to each of the player characters is increased or deceased in accordance with progress of a battle. Even in the case where a battle between the active character and an enemy character is executed during the progress of the game, the player switches the active character while grasping the state of the parameter set to each of the player characters of the player. This makes it possible for the game to proceed strategically.

In this regard, the enemy character may be the player character that other player causes to participate in the game, or a non-player character operated by a control of the server apparatus independently of an operation of any player.

In this case, it is preferable that the display controller causes the display device to display the active character with a display state different from those of the other player characters among the player characters that the player of the terminal apparatus causes to participate in the network game.

In this case, the player can distinguish the active character that can be moved in the virtual space by an operation of the player from other player characters on the basis of the display appearance displayed on the display device. Thus, the player can cause the game to proceed smoothly.

Further, in order to achieve the above object, according to a second aspect of the present invention, the present invention is directed to a terminal apparatus for executing a network game. The terminal apparatus is connected to a server apparatus via a network, and the terminal apparatus allows a plurality of player characters to participate in the network game. The player characters caused to participate in the network game exist in a common virtual space.

The terminal apparatus includes an active character selector that selects one player character as an active character whose action is activated among the player characters in accordance with an operation of the player of the terminal apparatus, the player causing the player characters to participate in the network game.

The terminal apparatus also includes an active character information transmitter that transmits active character information to the server apparatus via the network, the active character information being capable of specifying the active character selected by the active character selector and non-active characters other than the active character.

The terminal apparatus also includes a movement instruction input controller that inputs a movement instruction in accordance with an operation of the player, the movement instruction being used to move the active character selected by the active character selector in the virtual space.

The terminal apparatus also includes a movement information transmitter that transmits movement information in accordance with the movement instruction inputted by the movement instruction input controller to the server apparatus via the network.

The terminal apparatus also includes a visible range information receiver that receives visible range information transmitted by the server apparatus via the network in accordance with the information transmitted by each of the active character information transmitter and the movement information transmitter, the visible range information being capable of specifying all of the player characters each existing in a visible range, the visible range being set to a predetermined range of the virtual space within a range displayed on a display device with which the terminal apparatus is provided, at least the active character currently selected being included in the predetermined range of the virtual space.

The terminal apparatus also includes a display controller that causes the display device to display the visible range, all of the player characters specified by the visible range information received by the visible range information receiver being arranged in the visible range.

In this case, the display controller causes the display device to display the visible range in which all of the player characters specified by the visible range information are arranged so that the player character that the player of the terminal apparatus causes to participate in the network game can be distinguished from other player character that another player causes to participate in the network game and so that the player of the terminal apparatus can distinguish the active character from the non-active characters among the player characters that the player causes to participate in the network game.

Moreover, in order to achieve the above object, according to a third aspect of the present invention, the present invention is directed to a method of displaying a game screen of a display device of each of a plurality of terminal apparatuses to execrate a network game in a network game system. In the network game system the plurality of terminal apparatuses are connected to a server apparatus vice a network, and each of the terminal apparatuses allows a plurality of player characters to participate in the network game. The player characters caused to participate in the network game exist in a common virtual space.

The method includes selecting one player character as an active character whose action is activated among the player characters in accordance with an operation of an input section of the terminal apparatus by the player, the player causing the player characters to participate in the network game.

The method also includes transmitting active character information to the server apparatus via the network using a communication section of the terminal apparatus the active character information being capable of specifying the selected active character and non-active characters other than the active character.

The method also includes inputting a movement instruction in accordance with an operation of the input section by the player, the movement instruction being used to move the selected active character in the virtual space.

The method also includes transmitting movement information to the server apparatus via the network using the communication section of the terminal apparatus, the movement information corresponding to the inputted movement instruction.

The methods also includes receiving visible range information transmitted by the server apparatus via the network in accordance with the active character information and the movement information, the visible range information being capable of specifying all of the player characters each existing in a visible range, the visible range being set to a predetermined range of the virtual space within a range displayed on the display device, at least the active character currently selected being included in the predetermined range of the virtual space.

The method also includes causing the display device to display the visible range in which all of the player characters specified by the received visible range information are arranged so that the player character that the player of the terminal apparatus causes to participate in the network game can be distinguished from other player character that another player causes to participate in the network game and so that the player of the terminal apparatus can distinguish the active character from the non-active characters among the player characters that the player causes to participate in the network game.

Moreover, in order to achieve the above object, according to a fourth aspect of the present invention, the present invention is directed to a computer program product for displaying a game screen of a display device of each of a plurality of terminal apparatuses to execute a network game in a network game system. In the network game system the plurality of terminal apparatuses are connected to a server apparatus via a network, and each of the terminal apparatuses allows a plurality of player characters to participate in the network game. The player characters caused to participate in the network game exist in a common virtual space. The computer program product causing each of the terminal apparatuses to execute the steps including selecting one player character as an active character whose action is activated among the player characters in accordance with an operation of the player, the player causing the player characters to participate in the network game.

The steps also include transmitting active character information to the server apparatus-s via the network using a communication section of the terminal apparatus, the active character information being capable of specifying the selected active character and non-active characters other than the active character.

The steps also include inputting a movement instructor in accordance with an operation of the player, the movement instruction being used to move the selected active character in the virtual space.

The steps also include transmitting movement information to the server apparatus via the network using the communication section of the terminal apparatus, the movement information corresponding to the inputted movement instruction.

The steps also include receiving visible range information transmitted by the server apparatus via the network in accordance with the active character information and the movement information, the visible range information being capable of specifying all of the player characters each existing in a visible range, the visible range being set to a predetermined range of the virtual space within a range displayed on the display device, at least the active character currently selected being included in the predetermined range of the virtual space.

The steps also include causing the display device to display the visible range in which all of the player characters specified by the received visible range information are arranged so that the player character that the player of the terminal apparatus causes to participate in the network game can be distinguished from other player character that another player causes to participate in the network game and so that the player of the terminal apparatus can distinguish the active character from the non-active characters among the player characters that the player causes to participate in the network game.

It is preferable that the computer program product according to the fourth aspect of the present invention is presented as a computer-readable storage medium. The computer-readable storage medium is configured to detachably attach the computer apparatus, and may be presented individually from the computer apparatus. The storage medium may be a recording medium such as a fixed disk apparatus provided in the computer apparatus and presented together with the computer apparatus. Alternatively, the program of the computer program product according to the fourth aspect of the present invention may be delivered to the computer apparatus via the network from a server apparatus each existing on the network by super-imposing data signals thereof on a carrier wave.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings:

FIG. 6A is a drawing that shows a player management table provided in the game server apparatus shown in FIG. 3;

FIG. 6B is a drawing that shows a character management table provided in game server apparatus shown in FIG. 3;

FIG. 7 is a drawing that shows an example of a character table provided in the video came apparatus shown in FIG. 2;

DETAILED DESCRIPTION OF THE INVENTION

Preferred embodiments of a network game system, a network game terminal, a method of displaying a game screen, a computer program product and a storage medium according to the present invention will now be described in detail with reference to the appending drawings.

Figure 1:
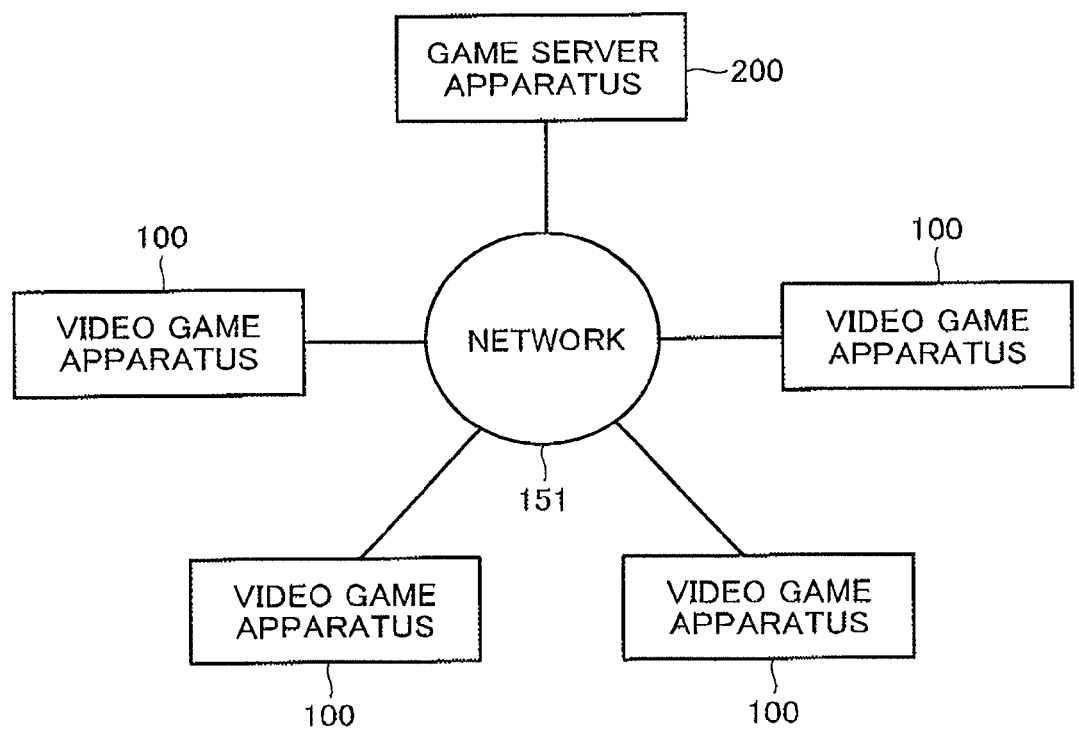
FIG. 1 is a block diagram that shows the configuration of a network game system according to the present embodiment.

FIG. 1 is a block diagram that shows the configuration of a network game system according to the present embodiment. As shown in FIG. 1, the network game system is configured from a plurality of video game apparatuses 100 (here, only four video game apparatuses are shown in FIG. 1) and a game server apparatus 200. Each of the video game apparatuses 100 is connected to the game server apparatus 200 via a network 151.

A game applied to the network game system is a registration type network game. A player who wants to participate in the game is required to obtain a player ID by registering his or her own information in the game server apparatus 200. The player who has obtained the player ID can participate in the game presented by the game server apparatus 200 after user authentication using the player ID and his or her password.

In the game applied to the network game system, each player using the video game apparatus 100 can create his or her own player character by combining tools prepared for each site constituting the player character (for example, an outline, a hair styles an eyebrow, eyes, a nose, a mouth and the like) to specify a form of the player character. The player can also create a plurality of player characters.

Information on the created player characters is to be registered in the game server apparatus 200. The game server apparatus 200 then issue a character ID for each of the player characters. Once the form of the player character is registered in the game server apparatus 200, it does not change depending on progress process of the game.

In order for the player character to participate in the game, the player gets user authentication using the player ID and the password issued by the game server apparatus 200 to become a player login state, and the player then specifies a player character to be caused to participate in the game from the created player characters, whereby the player can cause the player character to log in.

For each player using the video game apparatus 100, the game proceeds by moving his or her own player character on the field formed in a virtual three-dimensional space (game space) common to all of the player characters. In the virtual three-dimensional space, other player characters and the like exist in addition to his or her own player character that becomes the login state. The player can make an action of the single player character operated by the player such as a conversation with other player character of another player.

In this regard, in the present embodiment, the word "player login state" means a time period from the time when the player using the video game apparatus 100 gets authenticated with the player ID and the password at a player login process to the time when the player using the video game apparatus 100 makes his or her exit from the game at a player logout process. Further, the word "character login state" means a time period from the time when the player character of the player that becomes the player login state participates in the game at a character login process to the time when the player character makes its exit from the game at a character logout process.

In a time period other than these time periods, even though any information is transmitted and received between the video game apparatus 100 and the game server apparatus 200, each of the player and the player character are in a logout state. Moreover, in the present embodiment, in order to simplify the explanation, the communication between the video game apparatus 100 and the game server apparatus 200 is not cut (or disconnected) without a logout process. Further, in the case where all of the player characters of the player that is in the player login state logs out, the player logout process is to be executed.

Figure 2:
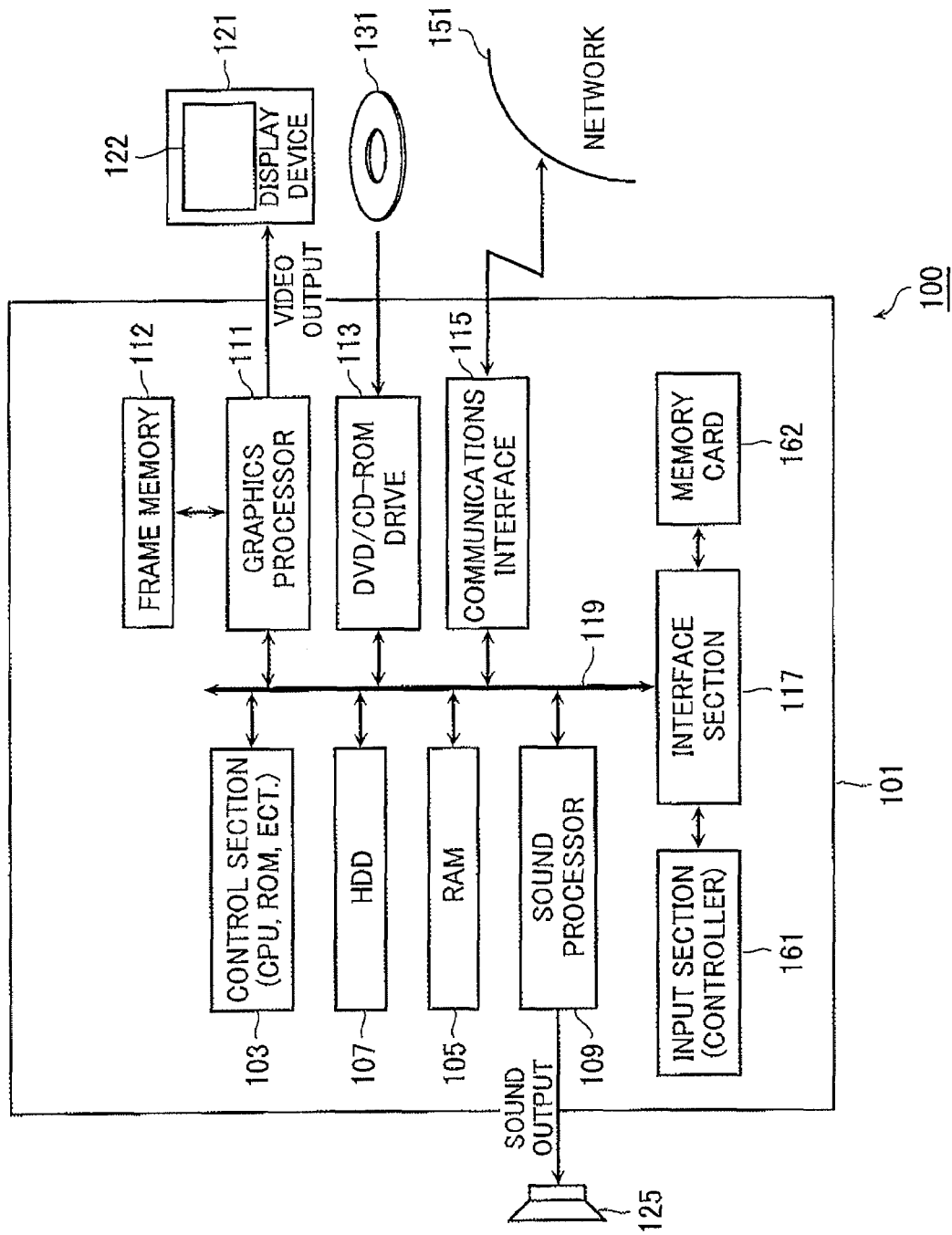
FIG. 2 is a block diagram that shows the configuration of the video game apparatus shown in FIG. 1.

FIG. 2 is a block diagram that shows the configuration of the video game apparatus 100 shown in FIG. 1. As shown in FIG. 2, the video game apparatus 100 is configured from a video game apparatus main body 101 as a main component. The video game apparatus main body 101 includes a control section 103, a Random Access Memory (RAM) 105, a Hard Disk Drive (HOD) 107, a sound processor 109, a graphics processor 111, a DVD/CD-ROM drive 113, a communications interface 115, and an interface section 117. Each of these components is connected to an internal bus 119.

The sound processor 109 of the video game apparatus main body 101 is connected to a sound output device 125 such as a speaker. The graphics processor 111 is connected to a display device 121 having a display screen 122. In the DVD/CD-ROM drive 113, a storage medium (in the present embodiment, a DVD-ROM or CD-ROM) 131 can be loaded (or inserted). The communications interface 115 is connected to the network 151. An input section (controller) 161 and a memory card 162 is connected to the interface section 117.

The control section 103 includes a Central Processing Unit (CPU), a Read Only Memory (ROM) and the like. The control section 103 executes programs stored in the HDD 107 and/or the storage medium 131, and also executes a control of the video game apparatus main body 101. The control section 103 also includes an internal timer for clocking current time.

The RAM 105 is a work area for the control section 103. The HDD 107 is a storage area for storing program and data. In the case where the program executed by the control section 103 instructs to execute a sound output, the sound processor 109 interprets the instruction to output a sound signal to the sound output device 125.

The graphics processor 111 develops an image on a frame memory (frame buffer) 112 (here, in FIG. 2, although it is drawn outside the graphics processor 111, it is provided in a RAM included in a chip configuring the graphics processor 111) in accordance with a drawing command outputted from the control section 103. The graphics processor 111 outputs a video signal indicating the image onto a display screen 122 of the display device 121. One frame time of the image included in the video signal outputted from the graphics processor 111 is $1/30$ seconds, for example.

However, visible range information indicating an object or objects included in a visible range, which is a display target of the image, among objects each existing in a game space is transmitted from the game server apparatus 200 every $1/15$ second. For this reason, the graphics processor 111 may draw one image every two frame (that is, every $1/15$ seconds).

The DVD/CD-ROM drive 113 executes to read out programs and data from the storage medium 131. The communications interface 115 is connected to the network 151 to execute to communicate with other computers (including the game server apparatus 200). The input section 161 includes a directional key, a plurality of operational buttons, a keyboard for carrying out to enter characters, and a mouse for inputting a position of coordinates on the display device 121. The input section 161 causes a player character (will be described later)

to move by means of an operation of the directional key, whereby the player character is caused to execute a predetermined process by means of an operation of the operational buttons. The operational buttons are used to input a predetermined instruction. A movement operation of the mouse moves a cursor (will be described later), and a click operation of the mouse is used to execute a process corresponding to an item to which the cursor as attached. The keyboard is used to enter texts such as a name of a player character.

The interface section 117 outputs input data from the input section 161 to the RAM 105, and the control, section 103 then interprets them to execute arithmetic processing. The interface section 117 also causes the memory card 162 to store the data indicating progress of the game developed on the RAM 105 therein on the basis of an instruction from the control section 103, and reads out data of the game during interruption stored in then memory card 162 to transmit it to the RAM 105.

The programs and data for executing the game on the video game apparatus 100 are initially stored in a storage medium 131, for example. The data stored in the storage medium 131 include all graphical data for constructing objects each existing in the game space (for example, fields formed in the game space, his or her own player character and the other player character). Thus, a visible range, a position of each object included the visible range, and objects each having a selective form (his or her own player character and the other player character) are not necessarily received as graphical data from the game server apparatus 200 so long as information capable of specifying these forms can be received. In such a case, an image to be displayed on the display screen 122 can be drawn.

The programs and data stored in the storage medium 131 are read out from the DVD/CD-ROM drive 113 at the execution, and they are loaded onto the RAM 105. The control section 103 processes the programs and data loaded onto the RAM 105, outputs a drawing command to the graphics processor 111, and outputs an instruction of a sound output to the sound processor 109. Intermediate data while the control section 103 processes are memorized in the RAM 105.

Figure 3:
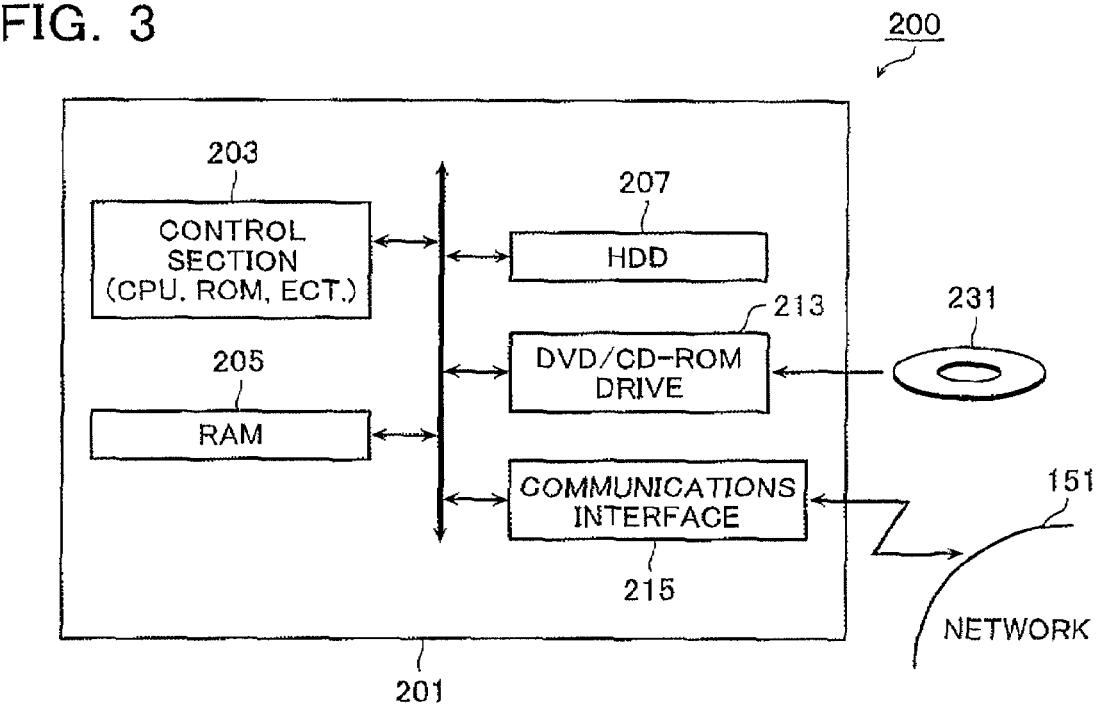
FIG. 3 is a block diagram that shows the configuration of the game server apparatus shown in FIG. 1.

FIG. 3 is a block diagram that shows the configuration of the game server apparatus 200 shown in FIG. 1. As shown in FIG. 3, the game server apparatus 200 is configured from a game server apparatus main body 201 as a main component. The game server apparatus main body 201 includes a control section 203, a RAM 205, a Hard Disk Drive (HDD) 207, a DVD/CD-ROM drive 213, and a communications interface 215. Each of these components is connected to an internal bus 219. In the DVD/CD-ROM drive 213, a storage medium (in the present embodiment, a DVD-ROM or CD-ROM) 231 can be loaded (or inserted).

The control section 203 includes a Central Processing Unit (CPU), a Read Only Memory (ROM) and the like. The control section 203 executes programs stored in the HOD 207 and/or the storage medium 231, and executes a control of the game server apparatus 200. The control section 203 also includes an internal timer for clocking current time. The RAM 205 is a work area of the control section 203. The HDD 207 is a storage area for storing programs and data. The communications interface 215 is connected to the network 151 to execute to communicate with each of the video game apparatuses 100.

The programs and data to execute the network game on the game server apparatus 200 are initially stored in the storage medium 231, and then installed into the HDD 207 from the storage medium 231. These programs and data are read out from the HDD 207 at the execution, and they are then loaded onto the RAM 205. The control section 203 processes the programs and data loaded onto the RAM 205. The control section 203 causes the network game to proceed on the basis of information transmitted from each of the video game apparatuses 100. Intermediate data while the control section 203 processes are memorized in the RAM 205.

In the game applied to the network game system, each player can create up to four player characters and register them in the game server apparatus 200. The player can cause a plurality of player characters to participate in the game (or become a character login state) at the same time. However, the player cannot move the plurality of player characters on the field at the same time. The player has to specify one player character as an active character among the player characters each being in a character login state. In this case, only an active character can be an action target by an operation of input section 161 from the player.

Hereinafter, one player character currently becoming active among the player characters being in the character login state is particularly referred to as an "active character", while each of the other player characters currently not becoming active are particularly referred to as a "non-active character". In the case where the number of player characters being in the character login state ids one for one player who is in a player login state, the player character is automatically specified as the active character. Specification and change of the active character will be described later in detail.

In the network game according to the present embodiment, a field is formed in the virtual three-dimensional space as a movement space for the player characters). The player moves the player character on the field by operating the input section 161, whereby the game proceeds. The position in the virtual three-dimensional space in which the field is formed is uniquely specified by means of coordinates of the world coordinate system (X, Y, Z). The graphical data on the objects each existing on the field are configured by a plurality of polygons each vertex of which is indicated by the coordinates in the world coordinate system.

The player character is configured by a plurality of polygons each vertex of which is indicated by the coordinates of a local coordinate system (x, y, z). The central point of player character is set to a reference point. The position in the virtual three-dimensional space is indicated by the coordinates of the reference point in the world coordinate system. Further, a direction (or orientation) of the layer character is represented by angles made by the respective axes of the local coordinate system and the respective axes of the world coordinate system.

On executing a display process, the coordinates of characteristic points (vertexes of the respective polygons) of all of the objects included in the visible range are transformed into coordinates of the world coordinates system. Further, a proceeding direction of the player character is determined on the basis of the positional relationship of the positions of the player character between a current frame time period and a previous frame time period.

Figure 4:
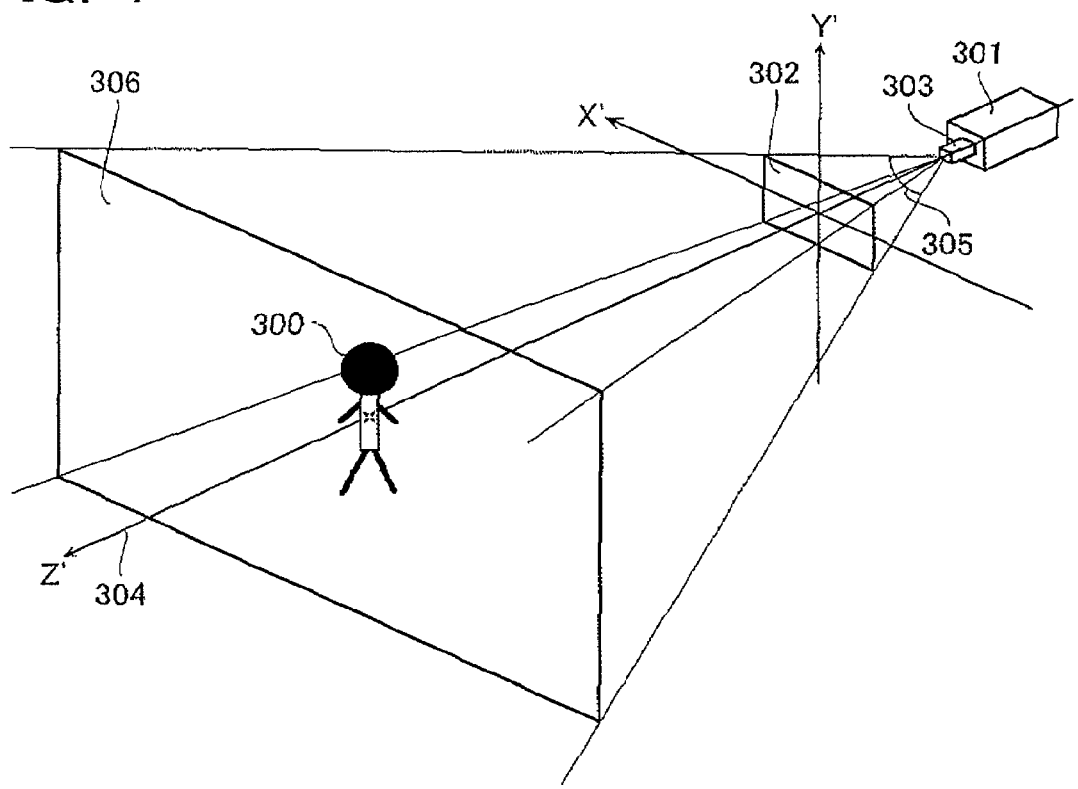
FIG. 4 is a drawing that schematically shows a process of subjecting a virtual three-dimensional space including the player character to perspective transformation to display it.

The state where the characters in the virtual three-dimensional space including the active character moves in the space is projected on the display screen 122 by perspective transforming the virtual three-dimensional space by means of a virtual camera, whereby the player can recognize the state. FIG. 4 schematically shows the state of the perspective transformation. A virtual camera 301 is positioned in the virtual three-dimensional space, and the image projected onto a virtual screen 302 is an image displayed on the display screen 122.

The position of the virtual camera 301 becomes a viewpoint 303, a direction of the virtual camera 301, becomes a visual axis 304, and an area made by four straight lines that are obtained by connecting the viewpoint 303 to the four respective vertexes of the virtual screen 302 becomes a field of view 305. Since the size of the virtual screen 302 is fixed, there is the following relationship. Namely, when in area of the field of view 305 is determined, the position of the virtual screen 302 is determined. On the other hand, when the position of the virtual screen 302 is determined, the area of the field of view 305 is determined.

Since the visual axis 304 passes through the central point of the virtual screen 302, a reference point (here, a reference position of the active character) always comes to the center position of the display screen. Further, a clip surface 306 is determined at a predetermined distance from the viewpoint 303 in the direction of the visual axis 304. A range (that is, visible range) in which the image is generated in a clipping range, that is, the virtual three-dimensional space by means of the perspective transformation becomes a range from the virtual screen 302 to the clip surface 306 within the range of the field of view 305.

Thus, the coordinate system used to project an image on the virtual screen 302 is a viewpoint coordinate system (X', Y', Z'), and the direction of the visual axis 304 becomes the z' axis of the viewpoint coordinate system. The coordinates of the world coordinate system (including the coordinates transformed from the coordinates of the local coordinate system) are transformed into coordinates of the viewpoint coordinate system, and the perspective transformation process including the following hidden surface removal process is executed.

In the case where an image projected on the virtual screen 302 is generated by means of the perspective transformation, there is need to execute a hidden surface removal process for removing a surface of the object hidden by another object placed in the front thereof. In the present embodiment, a Z buffer method is used as the hidden surface removal method. When the control section 103 transforms the coordinates of the world coordinate system to the coordinates of the viewpoint coordinate system, the control section 103 transmits the coordinates of the respective characteristic points to the graphics processor 111, and outputs the drawing command thereto. On the basis of this drawing command, the graphics processor 111 updates the value of the Z buffer so that data (the value of Z') on the points (small points of the Z' coordinate) which reside at the front side are retained with respect to the respective characteristic points, and develops the image data on the characteristic points on the frame memory 112 for every update.

On conditions to execute perspective transformation, there is need that the position of the viewpoint 303 of the virtual camera 301, the direction of the visual axis 304, the size of the field of view (or visual angle) 305 (including a distance from the viewpoint 303 to the virtual screen 302) and a distance from the viewpoint 303 to the clip surface 306 (hereinafter, referred to as a "clipping distance") have been determined (in this regard, the position of the virtual screen 302 is inevitably determined when these are determined). The position of the viewpoint 303 is kept at a position of a constant distance from the active character 300 in a predetermined direction, and moves so as to follow the active character 300. The direction of visual axis 304 is constantly set so as to necessarily face the reference point of the active character 300. The magnitude of the visual angle 305 and the clipping distance are basically set to the same sizes, respectively.

Therefore, in the game provided in the network game system according to the present embodiment, when the position of the active character 300 is determined, the range of the virtual three-dimensional space displayed on the display screen 122 is uniquely determined. The positions of the player characters including the active character 300 in the game space are managed in the game server apparatus 200 as will be described later.

Next, in the game provided in the network game system according to the present embodiment, various screens to be displayed on the display screen 122 will be described with examples. In this regard, the player is already made user registration in the game system hereinafter. When the user authentication for the player using the video game apparatus 100 is normally executed in the game server apparatus 200 using the registered player ID and the password, a player login process is completed.

Figure 5A:
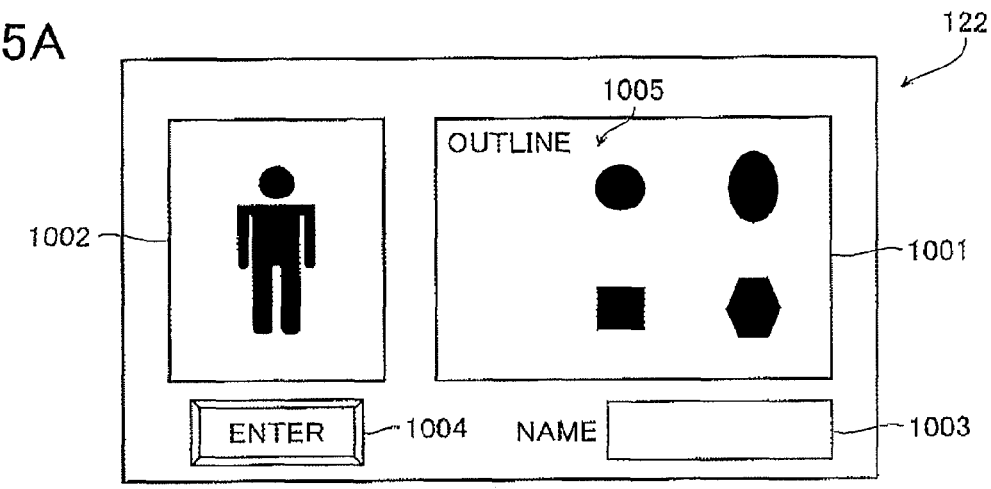
FIG. 5A is a drawing that shows an example of a character creating screen displayed on the display screen in the game presented in the network game system according to the embodiment of the present invention.

In the video game apparatus 100 used by the player who gets authenticated for login, when any player character has not been created yet, a character creating screen for creating a player is displayed on the display screen 122 of the video game apparatus 100. FIG. 5A is a drawing that shows an example of the character creating screen. In the present embodiment, the player cannot create a player character during the game or at the game restart.

In the character creating screen, a creation tool selecting display frame 1001, an image display frame 1002, a name input frame 1003, an enter button 1004 and a cursor 1005 are included. In any screen displayed on the display screen 122, the player can move the cursor 1005 on the display screen 122 by an operation of the mouse of the input section 161. An item to which the cursor 1005 is attached is an operational target by an operation of the input section 161 (including the operational button, the directional key, the keyboard, and a click of the mouse).

In the creation tool selecting display frame 1001, a plurality of tools are displayed for each site constituting a body of the player character such as an outline, a hair style, an eyebrow, eyes, a nose, a mouth and the like. In FIG. 5A, tools prepared for the site of the outline constituting the character are shown as an example. The player can move the cursor 1005 between the plurality of tools displayed on the creation tool selecting display frame 1001 by an operation of the mouse of the input section 161. The player attaches the cursor 1005 to any of the plurality of tools for the site displayed on the creation tool selecting display frame 1001 to make a click, whereby selection of the tool for the site can be determined.

In the image display frame 1002, an image of the form of a player character when the selection of the tool is determined to the tool to which the cursor 1005 is attached in the creation tool selecting display frame 1003 is displayed. In the image displayed on the image display frame 1002, the tool for the site displayed on the creation tool selecting display frame 1001 to which the cursor 1005 is attached is reflected in the state where tools for sites that have already been determined by means of clicks are fixed.

In the name input frame 1003, a frame for inputting a name of the player character to be used in a game world by the player is shown. The player operates the keyboard of the input section 161 in the state where the cursor 1005 is attached to the name input frame 1003, whereby the player can input the name of the player character. In this regard, the player cannot register the same name for two or more player characters.

When the player make a click in the state where the cursor 1005 is attached to the enter button 1004 after the player determines selection of tools for all of the sites and inputs the name of the player character, the creation of the player character can be completed. In the present embodiment, one player (having a player ID) can register up to four player characters in the game server apparatus 200. For this reason, when the creation of four player characters is completed, a screen on which a button "start of a game" can be selected is displayed on the display screen 122.

When the button "start of a game" is selected, character registration request information (including a character form and a name of each of the player characters) for request to register the created player character is transmitted from the communications interface 115 of the video game apparatus 100 to the game server apparatus 200. On the other hand, in the case where the creation of four player characters has not been completed yet, the character creating screen similar to that shown in FIG. 5A is displayed for creation of next player character. Thus, the player can execute creation of a new player character.

When the character registration request information from the video game apparatus 100 is received in the game server apparatus 200, a character ID is issued for each of the player characters. Character ID issuance information indicating the issued character IDs is transmitted from the communications interface 215 to the video game apparatus 100.

Figure 5B:
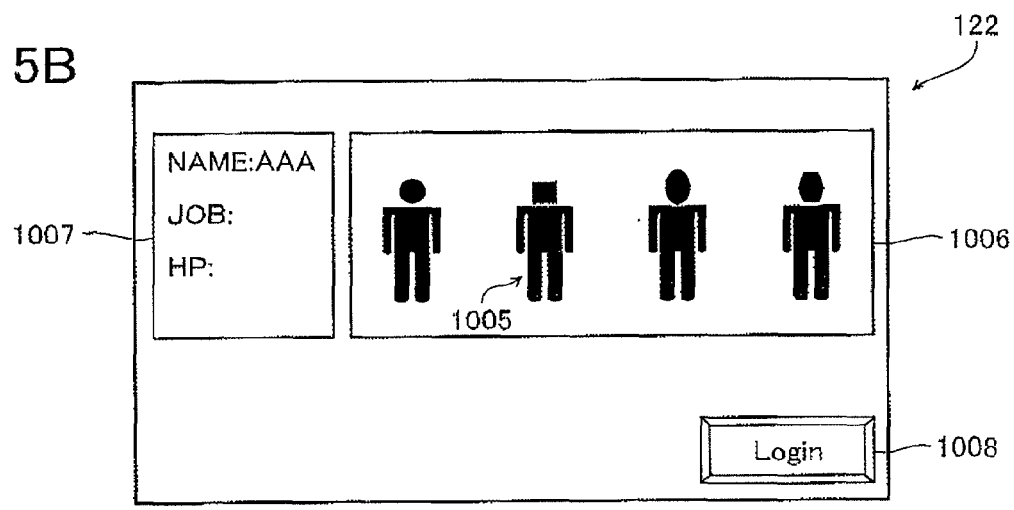
FIG. 5B is a drawing that shows an example of the character selecting screen.

On the display screen 122 of the video game apparatus 100 that receives the character ID issuance information, a character selecting screen for selecting one or more player character that the player causes to participate in the game is displayed. The player then selects a player character to be caused to participate in the game one by one. An example of the character selecting screen is shown in FIG. 5B. In the character electing screen, a character selecting display frame 1006, a character detailed information display frame 1007, a login button 1008, and the cursor 1005 are included.

In the character selecting display frame 1006, the forms of the created player characters are displayed as a list. In the character selecting display frame 1006, the player selects any one of the created player characters as a character (active character 300) to be caused to participate in the game. The player can move the cursor 1005 between the plurality of player characters displayed on the character selecting display frame 1006 by an operation of the mouse of the input section 161.

In the character detailed information display frame 1007, detailed information of information (including a name, a work, an HP and the like) registered for the player character to which the cursor 1005 is attached or whose selection is determined on the character selecting display frame 1006 is displayed. In this regard, the detailed information such as a work and an HP is uniformly set in default.

When a predetermined login condition is met (that is, a click is made in the state where the cursor 1005 is attached to any one of the plurality of player characters displayed on the character selecting display frame 1006), and the click is executed in the state where the cursor 1005 is attached to the login button 1008, a mark pattern (here, any one of a filled circle, a filled triangle, a dot and a cross) is automatically set for the player character. Character login request information (including the character ID) of the player character for request to log in the game is transmitted from the communications interface 115 of the video game apparatus 100 to the game server apparatus 200.

When the character login request information from the video game apparatus 100 is received in the game server apparatus 200, login for the player character is authenticated. Here, in the game server apparatus 200, a character login process is completed.

In the game server apparatus 200, visible range information is specified from positional information (that is, a character position 504 registered in a character management table 500) of the player character (active character 300) that gets authenticated for login. In the visible range information, information capable of specifying a position of each of objects (including non-active characters and other player characters of other players) included in a visible range and a form of each of the objects (including non-active characters and other player characters of other players) is included. The specified visible range information is transmitted from the communications interface 215 of the game server apparatus 200 to the video game apparatus 100.

Figure 5C:
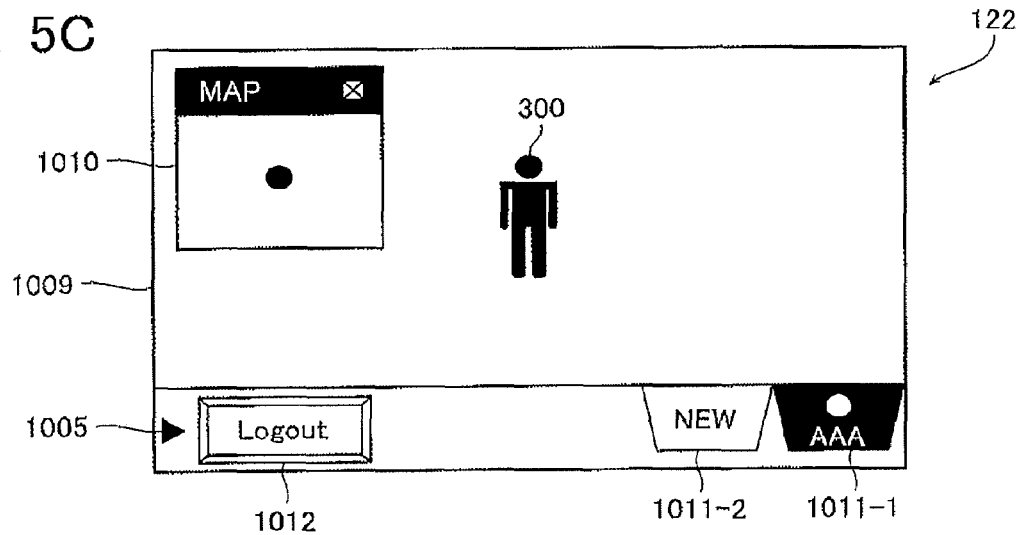
FIGS. 5C to 5E are drawings that respectively show examples of the game screen.

On the display screen 122 of the video game apparatus 100 that receives the visible range information, a game screen in which the player character is arranged on the field (in the present embodiment, the player character is arranged at the position where the logout has previously been executed or an initial position) is displayed. Here, an example of the screen displayed on the display screen 122 is shown in FIG. 5C. In this screen, the active character 300, a game screen 1009, a map display section 1010, a tab 1011, a logout button 1012 and the cursor 1005 are included.

In FIG. 5C, a character whose name is AAA (hereinafter, referred to as the "AAA" character. In addition, hereinafter, a character whose name is "***" will be referred to as a character.) is set as the active character 300, and a mark "filled circle" is set to the "AAA" character. In FIG. 5C, only the "AAA" character logs in the game (that is, only the "AAA" character becomes a player character login state). In other words, no non-active character is set in this case.

On the game screen 1009, an image on the field of the virtual three-dimensional space in which the visual axis 304 is directed to a reference point of the active character 100 (here, "AAA" character) from the viewpoint 303 of the virtual camera 301 is displayed. In the center of the game screen 1009, the active character 300 is displayed. The player can move the active character 300 displayed on the game screen 1009 in an input direction on the field by means of an operation of the directional key of the input section 161.

On the map display section 1010, a map of the field is displayed. In this regard, a range displayed on the map display section 1010 is wider than the range (perspective range) displayed on the game screen 1009 (for example, the whole field). The position of the player character on the field is shown with a mark (a filled circle, a filled triangle, a dot or a cross) set for the player character is displayed on the map display section 1010. The player can turn off the display of the map display section 1010 or change (extend or reduce) a display size of the map display section 1010 by clicking in the state where the cursor 1005 is attached to the map display section 1010.

The tab 1011 is set for each of the player characters that are in a login state. In the case where all of the created player characters are not in a login state yet, a NEW tab capable of setting a new player character is also set in the tab 1011 in addition to the tab set for each of the player characters that are in the login state. The tab 1011 is set from right to left in the order of the player characters that executes a login process. The NEW tab is set to leftmost position of the tabs set for each of the player character.

In the tab 1011 set for each of the player characters, a name of the player character and a mark set at the login are displayed. In order for the player to be capable of identifying the tab 1011 corresponding to the active character 300 among the tabs 1011 set for the respective player characters on the display screen 122, the tab 1011 of the player character 300 is displayed with a black color. In FIG. 5C, since only the "AAA" character logs in the game, a name "AAA" of the "AAA" character that is the active character 300 and a mark "filled circle" are displayed in a black tab 1011-1, while a mark "NEW" is displayed in a tab 1011-2.

The player makes a click in the state where the cursor 1005 is attached to the NEW tab, whereby it is possible to display a screen, on which a player character caused to be newly a login state can be selected, on the display screen 122. The screen displayed in this case is the same as the character selecting screen shown in FIG. 5B except for the following point. In the screen displayed by means of the click of the NEW tab, a player character that has already been in a login state is not displayed on the character selecting display frame 1006. Further, when a new player character is caused to log in the game in accordance with the screen displayed by means of the click of the NEW tab, the new player character becomes an active character 300, while the other player characters (including the active character 300) that have logged in the game previously become non-active characters.

By making a click in the state where the cursor 1005 is attached to the logout button 1012, a logout process for the active character 300 is executed. In the case where all of the player characters that are in the character login state logs out from the game, a logout process for the player is executed.

Figure 5D:
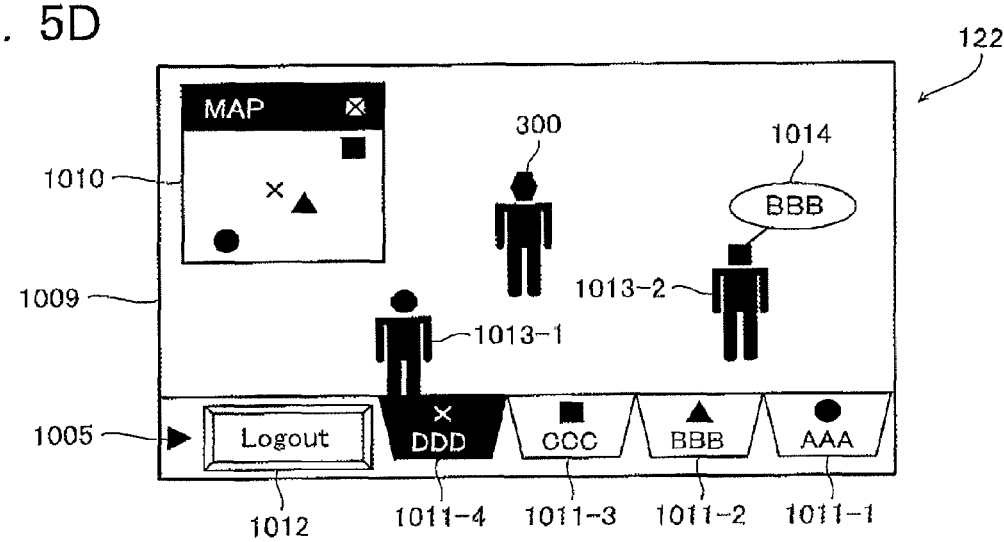

FIG. 5D shows the case where four player characters complete the login process in turn. Here, an "AAA" character, a "BBB" character, a "CCC" character and a "DDD" character log in the game. In the tab 1011, four tabs 1011-1 to 1011-4 are set for the respective player characters. In FIG. 5D, since all of the four player characters, which one player can register at the same time, log in the game, a NEW tab is not displayed. If the player character that finally logged in the game is the "DDD" character, the tab 1011-4 on which the name "DDD" and the mark "cross" are displayed is displayed with a black color.

The player makes a click in the state where the cursor 1005 is attached to any other tab 1011 than the tab 1011 (the name and the mark are displayed with a black color) corresponding to the active character 300, whereby it is possible to set the player character (the name and the mark are displayed) corresponding to the tab 1011 to a new active character 300. When the active character 300 is changed, the position of the viewpoint 303 of the virtual camera 301 is changed in accordance with positional information of the player character that newly becomes the active character 300.

In FIG. 5D, the "DDD" character set to the active character 300 is displayed so as to be positioned in the center of the game screen 1009. In FIG. 5D, a player character 1013-1 of another player and the "BBB" character 1013-2 that is the player character of the player are included in the visible range information received from the game server apparatus 200 in accordance with the positional information of the active character 300. The player characters other than the active character 300 among the player characters of the player displayed on the display screen 122 are displayed so that a name plate 1014 is attached to each of them. A name plate 1014 is not attached to the player character of another player. The name of the player character is displayed in the name plate 1014.

Figure 5E:
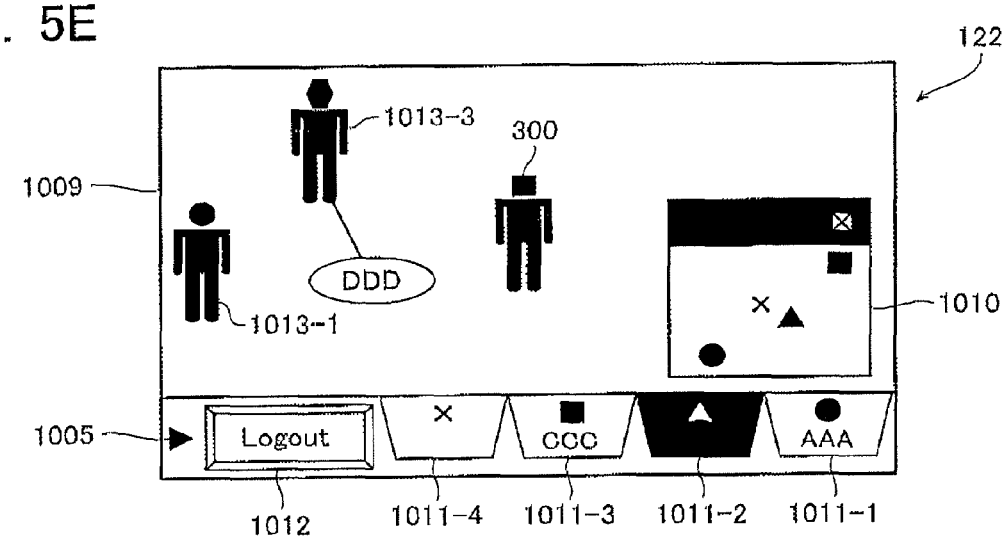

In FIG. 5D, when the tab 1011-2 on which the name "BBB" and the mark "filled triangle" are displayed is clicked, the display screen 122 becomes a state as shown in FIG. 5E. In FIG. 5E, the active character 300 is changed from the "DDD" character to the "BBB" character, whereby the viewpoint 303 of the virtual camera 301 is set in accordance with the positional information of the "BBB" character. Thus, the "BBB" character is displayed so as to be positioned in the center of the game screen 1009.

In FIG. 5E, the player character 1013-1, of another player and the "DDD" character 1013-3 that is the player character of the player are included in the visible range information received from the game server apparatus 200 in accordance with the positional information of the active character 300. The "DDD" character that is the player character of the player is displayed on the game screen 1009 so that a name plate 1014 is attached thereto, while the player character 1013-1 that is the player character of another player is displayed so that a name plate 1014 is not attached thereto.

Next, data to be managed by the game server apparatus 200 in the network game system according to the present embodiment will be described. The data shown in FIGS. 6A and 6B are only data particularly required to manage in the game server apparatus 200 for change of the active character 300. Description for other data to be required will be added as needed.

FIG. 6A is a drawing that shows the player management table provided in the RAM 205 of the game server apparatus 200. As shown in FIG. 6A, in the player management table 400, a player ID 401, a password (PW) 402, an online name (handle name) 403, a player login flag 404, and a character table address 405 are registered for each player. The character table address 405 indicates an initial address of the character management table created for the player.

The player ID 401 is identification information for identifying each player uniquely. The password 402 is used to execute user authentication for the player who transmits a player login request. When the combination of the player ID and the password transmitted together with player login request information corresponds with the combination of player ID 401 and the password 402 registered in the player management table 400, user authentication for the player is made. The player who gets user authentication selects one or more player character to be caused to login the game, the one or more player character can participate in the game.

The online name 403 is a name that each player uses in the game world. The same online name 403 is not registered for different players. The player login flag 404 is a flag set to the player who becomes a player login state. The player login flag 404 is set when the player gets user authentication, and reset when the player logout (logout of all of the player characters) is executed.

FIG. 6B is a drawing that shows the character management table provided in the RAM 205 of the game server apparatus 200. A character management table 500 is created for each player. As shown in FIG. 6B, in character management table 500, a character ID 501, a Name 502, a character form 503, a character position 504, character orientation 505, save information 506, an active flag 507 and a character login flag 50B are registered for each of the player characters. Since one player can register four player characters at the same time, a space capable of registering up to four player characters for each player is provided.

The character ID 501 is identification information for identifying the respective player characters uniquely. The name 502 is a name that each player character uses in the game world. There is a case where the same name 502 is registered for the created player characters for different players, but the same name 502 is not registered for the created player characters of one player. The character form 503 indicates a form of the player character used when the player plays the game. In the character form 503, the outline and clothes determined by the player when to participate in the game initially are registered.

The character position 504 indicates the position of the player character in the game space using coordinates set in the game space. The character orientation 505 indicates a direction (or orientation) that the player character faces in the range of 0 to 359 degrees in which a predetermined direction in the game space is set to a reference direction (direction to 0°), for example.

The save information 506 indicates play information when the player character played in the game space in past times. In the save information 506, the position of the player character (final logout point) in the game space and the data and time when the player character logged out last time are included. The player character that has never participated in the game space is not registered in the save information 506.

The active flag 507 is a flag set for the player character that is set to active. In the character management table 500 provided for one player ID 401, a plurality of active flags 507 are not set. The character login flag 508 is a flag set for the player character that is in a character login state. The character login flag 508 is set when a character login process for the player character is executed, and reset when a character logout process is executed.

Next, data managed in the video game apparatus 100 that receives the information registered in the character management table 500 (including the character ID 501 to the save information 506) from the game server apparatus 200 in the network game system according to the present embodiment will be described. The data shown in FIG. 7 are only data particularly required to manage in the video game apparatus 100 for change of the active character 300. Description for other data to be required will be added as needed.

FIG. 7 is a drawing that shows an example of the character table registered in the RAM 105 of the video game apparatus 100. As shown in FIG. 7, in a character table 600, a character ID 601, a name 602, a character form 603, a character position 604, character orientation 605, save information 606, an active flag 607, a tab number 608 and a mark 609 are registered for each player character.

The character ID 601 to the save information 606 in the character table 600 correspond to the character ID 501 to save information 506 in the character management table 500, respectively.

The tab number 608 indicates a number of the tab set for the player character. The tab number 608 is set to the MAX tab number at the point of time when the character login process for the player character is executed, and deleted when the character logout process is executed. The mark 609 indicates the type of mark (any of a filled circle, a filled triangle, a filled square and a cross) set for the player character. The mark 609 is automatically set when the character login process for the player character is executed, and deleted when the character logout process is executed. In one video game apparatus 100, the same mark 609 is not set for some of the plurality of player characters at the same time.

Figure 8:
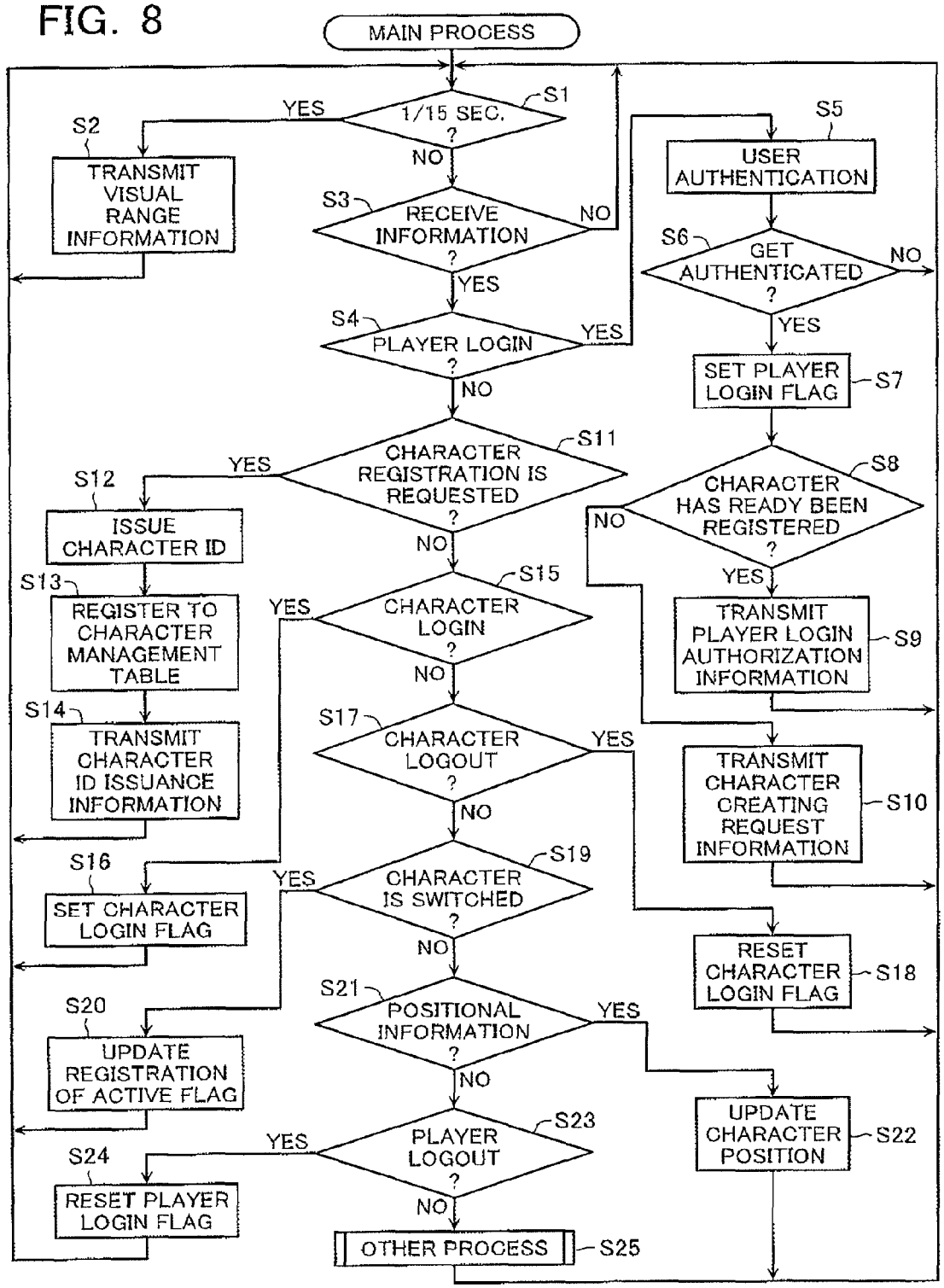
FIG. 8 is a flowchart that shows a main process executed in the game server apparatus in the network game system according to the embodiment of the present invention.

Processes for playing the network game according to the present embodiment in the game server apparatus 200 shown in FIGS. 1 and 3 will now be described. FIG. 8 is a flowchart that shows a main process executed in the game server apparatus 200. Although the processes executed in the game server apparatus 200 include processes other than the steps shown in the flowchart of FIG. 8, FIG. 8 shows the steps particularly executed in connection with the present invention.

In the game server apparatus 200, the control section 203 first determines whether or not the internal timer clocks a time period every 1/15 seconds (Step S1). In the case where it is determined that the internal timer clocks the time period every 1/15 seconds, the control section 203 specifies a visible range in accordance with positional information (character position 504) of the active character 300 (that is, the player character whose active flag 507 is set in the character management table 500) for each player who is in a player login state (that is, the player login flag 404 is set in the player management table 400) and for which at least one player character is in a character login state (that is, the character login flag 508 is set in the character management table 500 provided for the player ID 401).

The control section 203 generates visible range information including the position of each object (non-active character and the player character of another player) included in the respective specified visible range and information capable of identifying the form of the objects (non-active character and the player character of another player). The control section 203 transmits the visible range information from the communications interface 215 to the video game apparatus 100 that the player utilizes (Step S2). The processing flow returns to the process of Step S1.

On the other hand, in the case where it is determined at Step S1 that the internal timer does not clock the time period every 1/15 seconds, the control section 203 determines whether or not any information is received from any of the video game apparatuses 100 (including one before the player login) (Step S3). In the case where it is determined that no information is received from any of the video game apparatuses 100, the processing flow directly returns to the process of Step S1.

On the other hand, in the case where it is determined that any information is received from the video game apparatus 100, the control section 203 determines whether or not the received information indicates a login request of the player (Step S4). In the case where it is determined that the received information is the login request information for the player, the control section 203 compares the player ID and the password transmitted together with the player login request information with the player ID 401 and the password 402 registered in the player management table 400, whereby the control section 203 executes user authentication for the player of the video game apparatus 100 (Step S5).

As a result, the control section 203 determines whether or not the player is authenticated as a proper player who has a qualification to participate in the game (that is, whether or not the player ID and the password transmitted together with the player login request information correspond with the player ID 401 and the password 402 registered in the player management table 400) (Step S6).

In the case where it is determined that the player ID and the password transmitted together with the player login request information are not registered in the player management table 400, or in the case where it is determined that the player ID and the password transmitted together with the player login request information do not correspond with any player ID 401 and password 402 registered in the player management table 400, the player cannot get authenticated. Thus, control section 203 denies login of the player from the video game apparatus 100, and the processing flow directly returns to the process of Step S1. In this regard, in the case where the player cannot get authenticated, the control section 203 may transmit information indicating that fact to the video game apparatus 100 that the player utilizes from the communications interface 215.

On the other hand, in the case where it is determined that player ID and the password transmitted together with the player login request information are registered in the player management table 400 and the player can thereby get authenticated, the control section 203 permits login of the player, and sets a player login flag 404 in the player management table 400 for the player (Step S7). The control section 203 then determines whether or not information on the created player character is registered in the character management table 500 provided for the player ID (Step S8).

In the case where it is determined that the information on the created player character is registered, the control section 203 transmits player login permission information (including the character ID 501 to the save information 506 in the character management table 500 provided for the player ID 401) from the communications interface 215 to the video game apparatus 100 that the player utilizes (Step S9). The processing flow then returns to the process of Step S1.

On the other hand, in the case where it is determined that the information on the created player character is not registered, the control section 203 transmits character creation request information for request to create a player character from the communications interface 215 to the video game apparatus 100 that the player utilizes (Step S10). The processing flow then returns to the process of Step S1.

On the other hand, in the case where it is determined that the received information is not the player login request information, the control section 203 determines whether or not the received information indicates a registration request for the player character(s) (Step S11). In the case where it is determined that the received information is character registration request information, the control section 203 issues a character ID 501 for each of the player characters (Step S12). The control section 203 registers the name and the form of the player character transmitted together with the character registration request information in the character management table 500 provided in the RAM 205 so as to be associated with the issued character ID 501 (Step S13). The control section 203 then transmits the character ID issuance information from the communications interface 215 to the video game apparatus 100 that the player utilizes (Step S14). The processing flow then returns to the process of Step S1.

On the other hand, in the case where it is determined that the received information is not the character registration request information, the control section 203 determines whether or not the received information indicates a login request for the player character (Step S15). In the case where it is determined that the received information is the character login request information, the control section 203 sets a character login flag 508 in the character management table 500 for the player character. Here, in the case where there is the player character that has previously logged in the game for the player, the control section 203 sets an active flag 507 for the player character that newly logs in the game, and resets the active flag 507 for each of the other player characters of the player (Step S16). The processing flow then returns to the process of Step S1.

On the other hand, in the case where it is determined that the received information is not character login request information, the control section 203 determines whether or not the received information indicates a logout request for the player character (Step S17). In the case where it is determined that the received information is the character logout request information, the control section 203 resets the character login flag 508 registered in the character management table 500 for the player character. The control section 203 registers the character position 504 and the date and time for the player character in the save information 506 of the character management table 500. In the case where player characters for the player that have not logged out from the game yet remains, the control section 203 sets the active flag 507 for any player character among the player characters that have not logged out from the game yet, and transmits information indicating the change in the active character 300 to the video game apparatus 100 (Step S18). The processing flow then returns to the process of Step S1.

On the other hand, in the case where it is determined that the received information is not the character logout request information, the control section 203 determines whether or not the received information indicates switching of the active character 300 (Step S19). In the case where it is determined that the received information is the character switching information, the control section 203 updates (set or reset) the active flag 507 registered in the character management table 500 in accordance with the received information (Step S20). The processing flow then returns to the process of Step S1.

On the other hand, in the case where it is determined that the received information is not the character switching information, the control section 203 determines whether or not the received information is positional information for the player character (Step S21). In the case where it is determined that the received information is the positional information, the control section 203 updates the positional information (the character position 504 (and the character orientation 505)) of the player character (the active flag 507 for the player character is set) registered in the character management table 500 in accordance with the received information (Step S22). The processing flow then returns to the process of Step S1.

On the other hand, in the case where it is determined that the received information is not the positional information, the control section 203 determines whether or not the received information indicates a logout request for the player (Step S23). In the case where it is determined that the received information is the player logout request information, the control section 203 resets the player login flag 404 registered in the player management table 400 for the player (Step S24). The processing flow then returns to the process of Step S1. On the other hand, in the case where it is determined that the received information is not the player logout request information, the control section 203 executes a process according to other information (Step S25). The processing flow then returns to the process of Step S1.

Next, processes for playing the network game according to the present embodiment in the video game apparatus 100 will be described. In this regard, processes for generating an image every one frame time period in accordance with progress of the game, and displaying the image on the display screen 122 are executed by the control section 103 and the graphics processor 111. The process for displaying the image on the display screen 122 in the following explanation is mainly a process for the image generated every one frame. Explanation of the processes other than the specific processes in the present embodiment may be omitted. Further, information on intermediate process of the control section 103 (including information on the contents to be displayed) is temporarily stored in the work area of the RAM 105.

Figure 9:
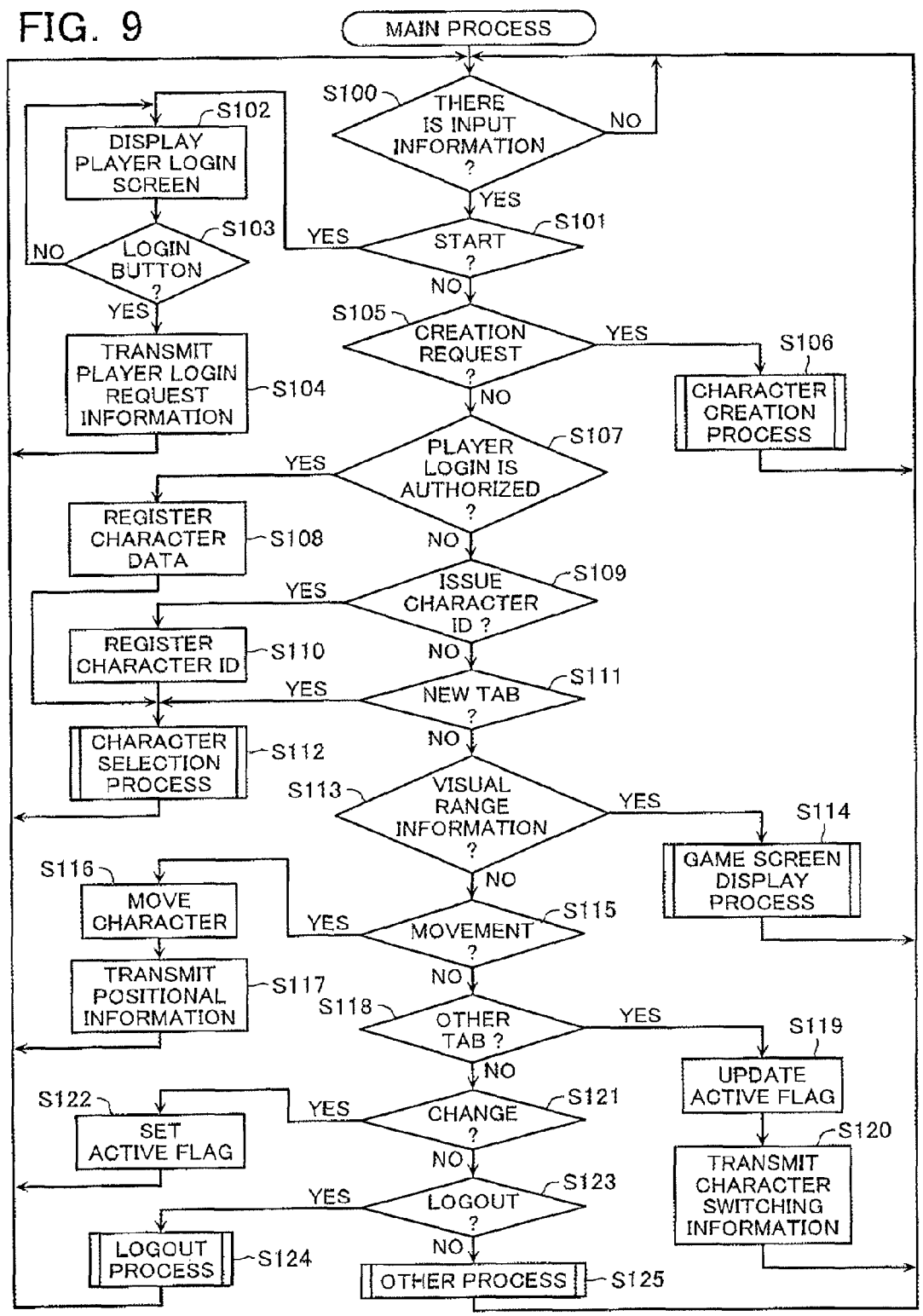
FIG. 9 is a flowchart that shows a main process executed in the video game apparatus in the network game system according to the embodiment of the present invention.

FIG. 9 is a flowchart that shows a main process executed in the video game apparatus 100. When the video game apparatus main body 101 of the video game apparatus 100 is powered on, START information is inputted to the control section 103.

In the video game apparatus 100, the control section 103 determines whether or not there is inputted information (START information due to power on, instruction information of the player inputted from the input section 161, or information received from the game server apparatus 200) (Step S100). The control section 103 repeatedly executes the process at Step S100 until any information is inputted so as to wait for input of any information.

In the case where it is determined that any information is inputted, the control section 103 determines whether or not the inputted information indicates START (start of the game) to be inputted due to power on (Step S101). In the case where it is determined that the inputted information is the START information, the control section 103 causes the display device 121 to display a player login screen on the display screen 122 (Step S102). In the player login screen, input frames for the player ID and the password, and a player login button are included in order to receive login of the player who has already got user registration in the game server apparatus 200.

The control section 103 then determines whether or not the player ID and the password are inputted and the player login button is entered on the player login screen (Step S103). In the case where it is determined that there is no entry of the player login button, the processing flow returns to the process of Step S102.

In the case where it is determined that the player ID and the password are inputted and the player login button is entered on the player login screen, the control section 103 transmits player login request information (including the player ID and the password) from the communications interface 115 to the game server apparatus 200 (Step S104). The processing flow then returns to the process of Step S100.

On the other hand, in the case where it is determined that the inputted information is not START information, the control section 103 determines whether or not the inputted information indicates a request to create the player character received from the game server apparatus 200 (Step S105). In the case where it is determined that the inputted information is character creation request information, the control section 103 causes the display device 121 to display the character creating screen on the display screen 122, and executes a character creating process for creating the player character. In the character creating process, the control section 103 transmits character registration request information from the communications interface 115 to the game server apparatus 200 (Step S106). After the character creating process is terminated, the processing flow returns to the process of Step S100. In this regard, the details of the character creating process will be described later.

On the other hand, in the case where it is determined that the inputted information is not the character creation request information, the control section 103 determines whether or not the inputted information indicates login permission for the player received from the game server apparatus 200 (Step S107). In the case where it is determined that the inputted information is the player login permission information, the control section 103 registers information (including the character ID 501 to the save information 506) on the character management table 500 included in the received information in the character table 600 (including the character ID 601 to the save information 606) provided in the RAM 105 (Step S108). The processing flow then proceeds to a process at Step S112.

On the other hand, in the case where it is determined that the inputted information its not the player login permission information, the control section 103 determines whether or not the inputted information indicates issuance of the character ID 501 received from the game server apparatus 200 (Step S109). In the case where it is determined that the inputted information is the character ID issuance information, the control section 103 registers the character ID 501 in the character ID 601 of the character table 600 provided in the RAM 105 (Step S110). The processing flow then proceeds to a process at Step S112.

On the other hand, in the case where it is determined that the inputted information is not the character ID issuance information, the control section 103 determines whether or not the inputted information indicates a click of the NEW tab in the screen displayed in the process at Step S114 (will be described later) (Step S111). In the case where it is determined that the inputted information is the information indicating the click of the NEW tab, the control section 103 causes the processing flow to proceed to a process at Step S112.

At Step S112, the control section 103 causes the display device 121 to display the character selecting screen on the display screen 122, and executes the character selecting process including selection of the player character caused to participate in the game and setup of the tab 1011. In the character selecting process, the control section 103 transmits the character login information and character switching information indicating that the active character 300 is switched from the communications interface 115 to the game server apparatus 200. After the character selecting process is terminated, the processing flow returns to the process of Step S100. In this regard, the details of the character selecting process will be described later.

On the other hand, in the case where it is determined that the inputted information is not the information indicating the click of the NEW tab, the control section 103 determines whether or not the inputted information is the visible range information received from the game server apparatus 200 (Step S113). In the case where it is determined that the inputted information is the visible range information, the control section 103 causes the display device 121 to display the game screen 1009 and the like on the display screen 122 in accordance with the visible range information (Step S114). Then, after the game screen displaying process is terminated, the processing flow returns to the process of Step S100. In this regard, the details of the game screen displaying process will be described later.

On the other hand, in the case where it is determined that the inputted information is not the visible range information, the control section 103 determines whether or not the inputted information indicates the input for instructing the active character 300 to move on the field in the game screen 1009 displayed in the process at Step S114 (Step S115). In the case where it is determined that the inputted information is the movement instruction inputting information, the control section 103 moves the position of the active character 300 on the field in accordance with the instruction (Step S116). The control section 103 then transmits positional information (character position 604 (and character orientation 605)) of the active character 300 after the movement from the communications interface 115 to the game server apparatus 200 (Step S117). The control, section 103 then causes the processing flow to return to the process of Step S100.

On the other hand, in the case where it is determined that the inputted information is not the movement instruction inputting information, the control section 103 determines whether or not the inputted information indicates a click of other tab 1011 (other than the NEW tab) on the screen displayed in the process at Step S114 (Step S118). In the case where it is determined that the inputted information is information indicating the click of other tab 1011 (other than the NEW tab), the control section 103 sets the active flag 607 to the player character corresponding to the clicked tab 1011 in the character table 600 provided in the RAM 105, and resets the active flag 607 of the player character corresponding to the previous active character 300 (Step S119). Here, the active character 300 is switched to the player character whose active flag 607 is newly set.

The control section 103 transmits the character switching information indicating that the active character 300 is switched from the communications interface 115 to the game server apparatus 200 (Step S120). The control section 103 then causes the processing flow to return to the process of Step S100.

On the other hand, in the case where it is determined that the inputted information is not the information indicating the click of other tab 1011 (other than the NEW tab), the control, section 103 determines whether or not the inputted information indicates a change of the active character 300 received from the game server apparatus 200 (Step S121). In the case where it is determined that the inputted information is the active character changing information, the control section 103 sets an active flag 607 of any of the player characters that are in a login state in accordance with the active character changing information in the character table 600 provided in the RAM 105 (Step S122). The control section 103 then causes the processing flow to return to the process of Step S100.

On the other hand, in the case where it is determined that the inputted information is not the active character changing information, the control section 103 determines whether or not the inputted information indicates a click of the logout button 1012 on the screen displayed in the process at Step S114 (Step S123). In the case where it is determined that the inputted information is the information indicating the click of the logout button 1012, the control section 103 executes a logout process for logout of the active character 300 (Step S124).

In the logout process, the control section 103 transmits the character logout information indicating that the active character 300 executes logout from the communications interface 115 to the game server apparatus 200. In the logout process, the control section 103 determines a new active character 300 in a predetermined method in the case where there is a non-active character.

In the logout process, the control section 103 transmits the player logout information (in the case where all of the player characters log out) or the character switching information (in the case where there is any other non-active character) from the communications interface 115 to the game server apparatus 200. The control section 103 then causes the processing flow to return to the process of Step S100 after the logout process is terminated.

On the other hand, in the case where the inputted information is not the logout inputting information, the control section 103 executes a process according to other information (Step S125). The processing flow then returns to the process of Step S100.

Figure 10:
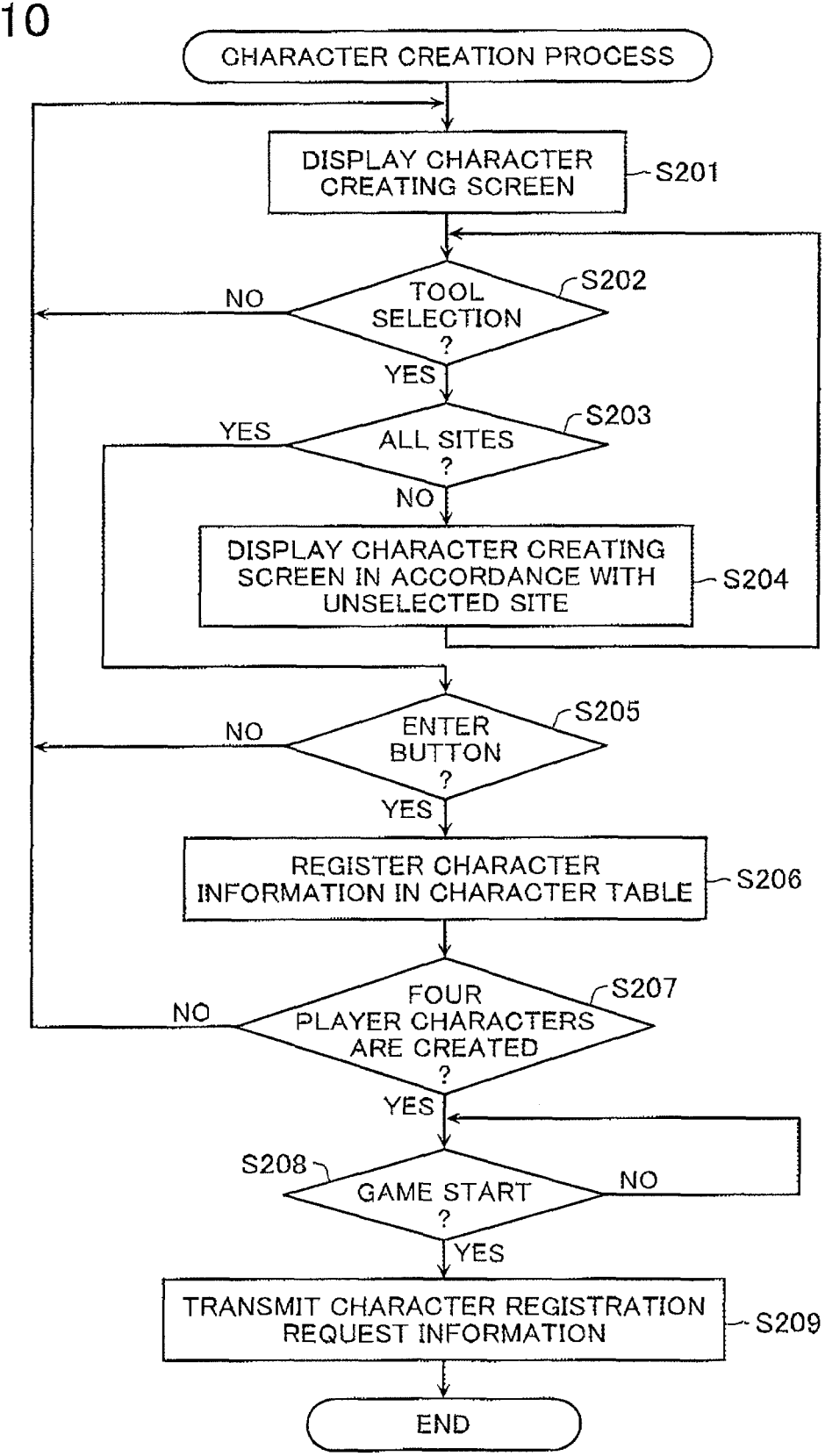
FIG. 10 is a flowchart that shows the character creating process of FIG. 9 in detail.

FIG. 10 is a flowchart that shows the character creating process executed at Step S106 of FIG. 9 in detail. In the character creating process, the control section 103 of the video game apparatus 100 causes the display device 121 to display the character creating screen (see FIG. 5A) on the display screen 122 (Step S201).

The control section 103 determines whether or not selection of the tool for the site displayed in the creation tool selecting display frame 1001 is decided by attaching the cursor 1005 to any of the plurality of tools for sites displayed in the creation tool selecting display frame 1001 on the character creating screen displayed on the display screen 122, and making a click on the tool (Step S202). In the case where it is determined that the selection of the tool is decided, the processing flow directly returns to the process of Step S201.

On the other hand, in the case where it is determined that the selection of the tool is not decided, the control section 203 determines whether or not the selection of tool for all of the sites constituting the player character is decided (Step S203). In the case where the selection of tool for all of the sites is not decided, the control section 203 causes the display device 121 to display the creation tool selecting display frame 1001 according to sites that the selection has not been decided yet, and to display the character creating screen (Step S204). The processing flow then returns to the process of Step S201.

On the other hand, in the case where it is determined that the selection of tool for all of the sites is decided, the control section 103 determines whether or not a name is inputted in the name input frame 1003 and the enter button 1004 is clicked (Step S205). In the case where the selection of the tool for all of the sites is decided and the name is inputted to the name input frame 1003 but the enter button 1004 is not clicked, the control section 103 repeatedly executes the processes at Steps S201 to S205.

In the case where the selection of the tool for all of the sites is decided, the name is inputted to the name input frame 1003, and the enter button 1004 is not clicked, then the control section 103 registers the tool selecting information for the respective tools and the inputted information of the name input frame 1003 in the character form 603 and the name 602 in the character table 600 provided in the RAM 105, respectively (Step S206). The control section 103 then determines whether or not four player characters have already been created (Step S207). In the case where it is determined that only one to three player character(s) has been created, the processing flow returns to a process at Step S201, and the control section 103 causes the display device 121 to display the character creating screen for creating a next player character on the display screen 122.

On the other hand, in the case where it is determined that four player characters have already been created, the control section 103 determines whether or not the button "start of a game" is entered (Step S208). In the case where it is determined that the button "start of a game" is not entered, the control section 103 repeatedly executes the process at Step S208 so as to wait for entry of the button "start of a game".

In the case where it is determined at Step S208 that the button "start of a game" is entered, the control section 103 transmits the character registration request information (including the character form and the name) from the communications interface 115 to the game server apparatus 200 (Step S209). The control section 103 terminates the character creating process to return the processes of flowchart shown in the FIG. 9.

Figure 11:
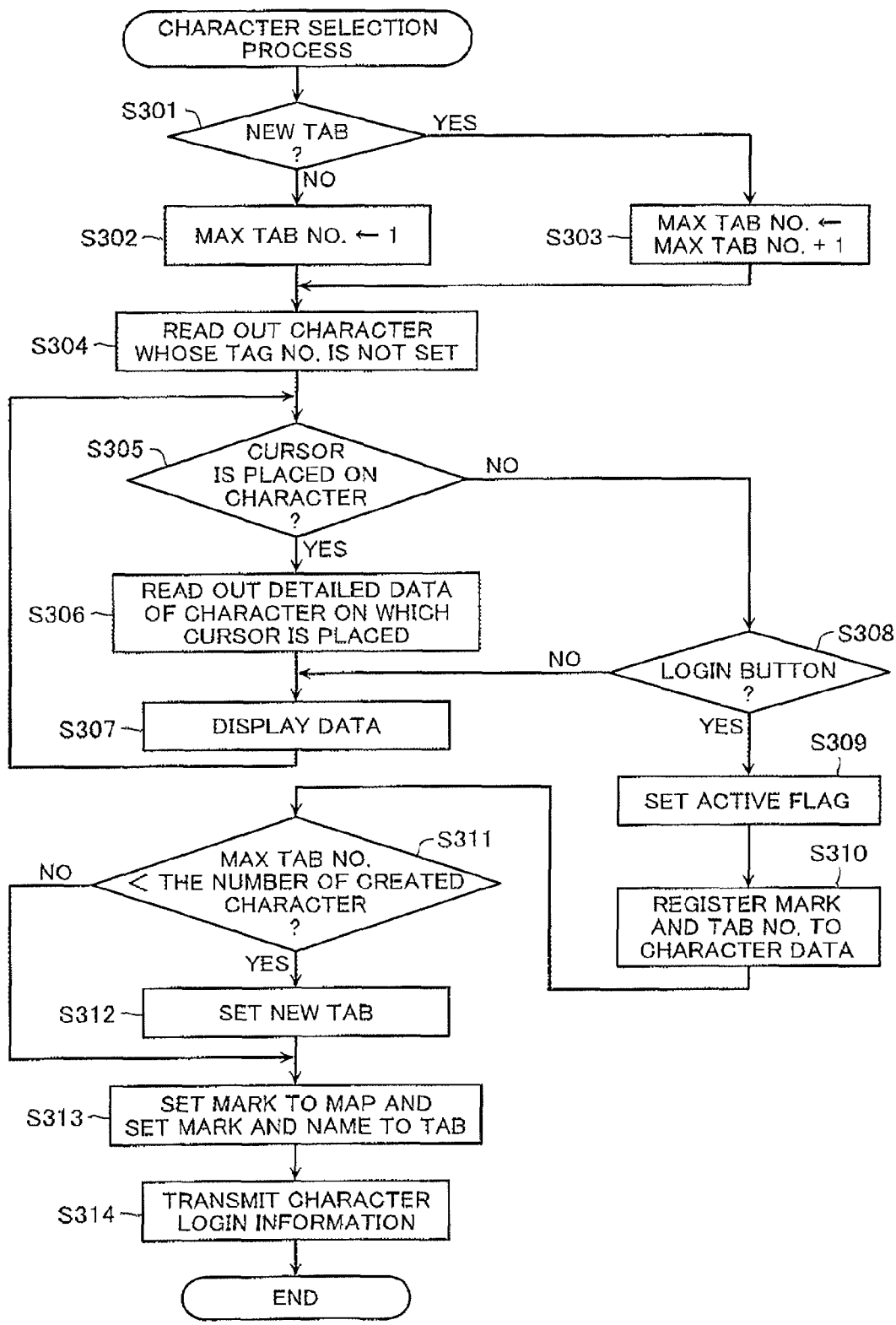
FIG. 11 is a flowchart that shows the character selecting process of FIG. 9 in detail.

FIG. 11 is a flowchart that shows the character selecting process executed at Step S112 of FIG. 9 in detail. In the character selecting process, the control section 103 of the video game apparatus 100 determines whether or not the inputted information indicates the click of the NEW tab (Step S301). In the case where it is determined that the inputted information does not indicate the click of the NEW tab, no player character participates in the game at this moment (that is, there is no player character that is in a character login state). Thus, the control section 103 sets the MAX tab number to "1" to initialize the MAX tab number (Step S302). The processing flow then proceeds to a process at Step S304.

On the other hand, an the case where it is determined that the inputted information indicates the click of the NEW tab, a new player character is caused to log in the game when the player character(s) participates in the game at this moment (that is, there is one or more player character that is in the character login state). Thus, the control section 103 adds "1" to the MAX tab number and sets the result as a new MAX tab number (Step S303). The processing flow then proceeds to a process at Step S304. At Step S304, the control section 103 reads out information on the character form 603 for the player character whose tab number 608 is not registered from the character table 600 provided in the RAM 105.

The control section 103 determines whether or not the cursor 1005 is attached to any of the player characters displayed in the character selecting display frame 1006 (Step S305). In the case where it is determined that the cursor 1005 is attached to any of the player characters, the control section 103 reads out detailed data on the player character (including the name 602 and the save information 606) from the character table 600 provided in the RAM 105 (Step S306).

The control section 103 causes the display device 121 to display the form of each of the player characters read out at Step S304 as a list in the character selecting display frame 1006 of the character selecting screen, and to display the detailed data read out at Step S306 in the character detailed information display frame 1007 (Step S307). The processing flow then returns to the process of Step S305.

In the case where it is determined at Step S305 that the cursor 1005 is not attached to any of the player characters, the control section 103 determines whether or not the login button 1008 is entered by selecting any of the player characters displayed in the character selecting display frame 1006 on the character selecting screen by means of a click (Step S308). In the case where it is determined that the login button 1008 is not entered, the processing flow returns to the process of Step S307.

On the other hand, in the case where it is determined that the login button 1008 is entered, the control section 103 sets the active flag 607 for the player character for which the selection is decided in the character detailed information display frame 1007 to the character table 600 (Step S309). In this regard, when the active flag 607 for other player character is set in the character table 600 (that is, when the second or later player character is caused to log in the game), the control section 103 resets the active flag 607 set for the other player character.

The control section 103 sets the MAX tab number to the tab number 608 of the character table 600 for the player character. The control section 103 automatically sets a mark to the mark 609 of the character table 600 for the player character (Step S310).

The control section 103 determines whether or not the value set to the MAX tab number is smaller than the number of player characters registered in the character table 600 provided in the RAM 105 (Step S311). In the case where it is determined that the value is smaller than the number of registered player character, a new player character to newly in a login state can be selected from the created player character (s). Thus, the control section 103 sets the NEW tab (Step S312). The processing flow then proceeds to a process at Step S313.

On the other hand, in the case where it is determined that the value set to the MAX tab number is equal to or more than the number of registered player characters, there is no registered player character that can newly become a login state. Thus, the processing flow directly proceeds to a process at Step S313.

At Step S313, the control section 103 sets the position of the player character to the map display section 1010, and sets the mark 609 and the name 602 to the tab 1011. The control section 103 then transmits the login information indicating that the player character (that is, the player character whose active flag 607 is set) logs in the game from the communications interface 115 to the game server apparatus 200 (Step S314). The control section 103 terminates the character selecting process to return the processes in the flowchart of FIG. 9.

Figure 12:
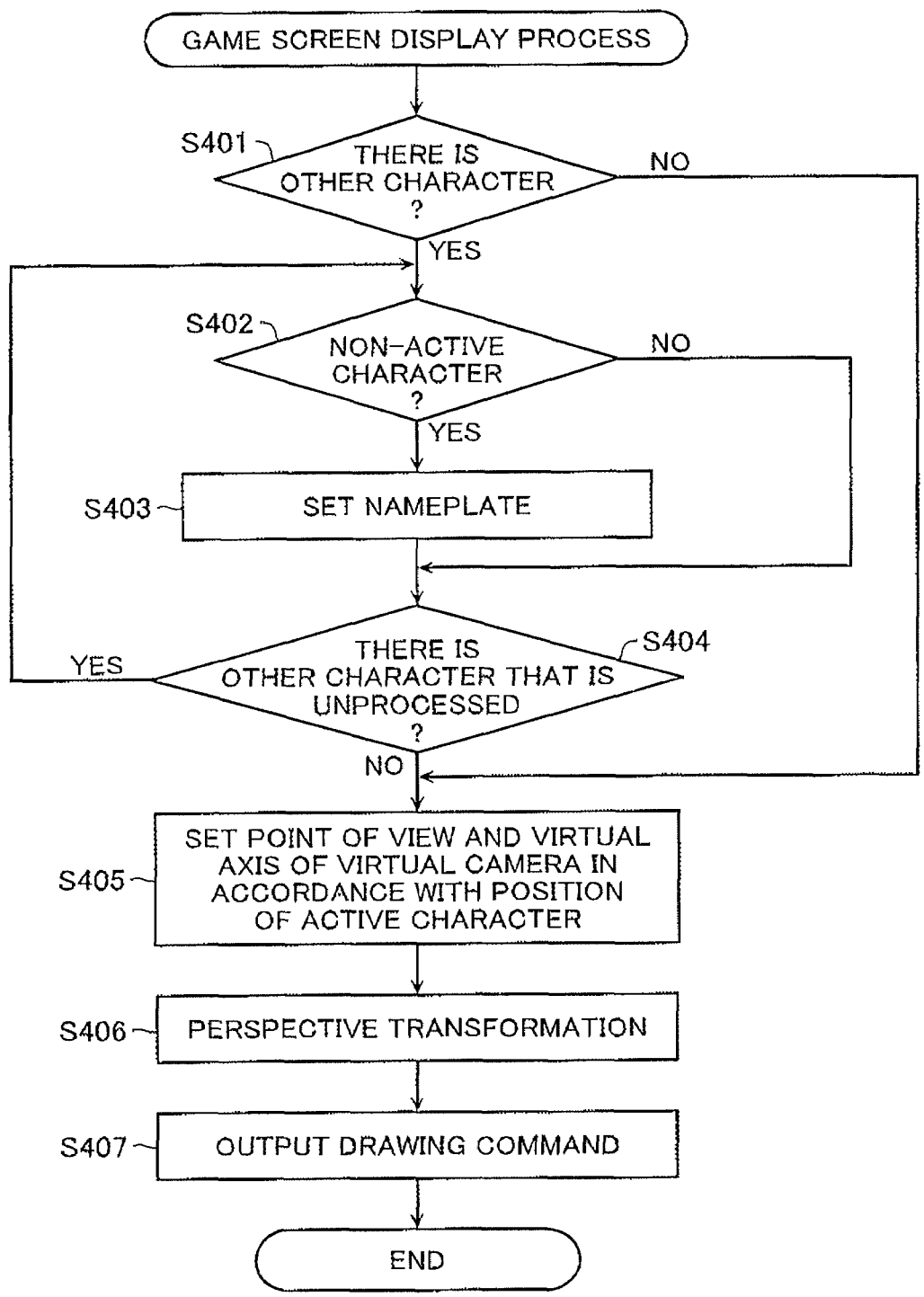
FIG. 12 is a flowchart that shows the game screen displaying process of FIG. 9 in detail.

FIG. 12 is a flowchart that shows the game screen displaying process executed at Step S114 of FIG. 9 in detail. In the game screen displaying process, the control section 103 of the video game apparatus 100 determines whether or not other player characters than the active character 300 (including non-active characters and other player character of another player) are included in the visible range information received from the game server apparatus 200 (Step S401). In the case where it is determined that other player character are not included, the processing flow directly proceeds to a process at Step S405.

On the other hand, in the case where it is determined that other player character(s) is included, the control section 103 determines whether or not the player character thus included is any non-active character (that is, the player character whose active flag 607 is not set among the player characters of the player) (Step S402). In the case where it is determined that the other player character included is any non-active character, the control section 103 sets so that a name plate 1014 is attached at a predetermined position, of the non-active character (Step S403). The processing flow then proceeds to a process at Step S404. On the other hand, in the case where it is determined that the other player character is not a non-active character, the processing flow directly proceeds to a process at Step S404.

At Step S404, the control section 103 determines whether or not there is any other player character that is not subjected to the processes (Steeps S402 to S403) in the visible range information. In the case where it is determined that there is any other player character, the processing flow returns to a process at Step S402, and executes the processes Steps S402 to S404 for all of any other player characters included in the visible range information. On the other hand, in the case where it is determined that there is no player character that is not subjected to the processes, the processing flow proceeds to a process at Step S405.

At Step S405, the control section 103 sets the position of the viewpoint 303 of the virtual camera to a predetermined position defined in accordance with the position of the active character 300, and sets the direction of the visual, axis 304 of the virtual camera 301 while a reference point of the active character 300 is set as the reference point (Step S405). The position of the virtual screen 302 and the position of the clip surface 306 are uniquely determined in this manner. By setting the virtual camera in this manner, the control section 103 executes perspective transformation to each object (active character 300 and other player character included in the visible range information, and topography of the field) existing in the virtual space on the virtual screen 302, and transforms coordinates of each vertex of the respective polygons configuring these objects to coordinates in the viewpoint coordinate system (Step S406).

The control section 103 then outputs a drawing command together with information on the respective polygons configuring these objects (including the transformed coordinates to the viewpoint coordinate system) to the graphics processor 111 (Step S407). The control section 103 terminates the game screen displaying process to return the processes in the flowchart of FIG. 9.

On the other hand, the graphics processor 111 develops the image of the respective polygons, which are transferred together with the drawing command, on the frame memory 112 while referring to the Z buffer. The image of the name plate 1014 is developed on the most anterior surface in accordance with the position of the corresponding player character. The graphics processor 111 also reads out the image developed on the frame memory 112 every one frame time period, and outputs the video signal, obtained by adding a synchronizing signal to the image, to the display device 121.

Thus, the game screen (game image) in which the active character 300 is positioned in the center of the game screen 1009 is displayed. In this regard, in the case where other player characters of the player exist in the range displayed in the game screen 1009 in addition to the active character 300, a name plate 1014 is displayed so as to be attached to each of the player characters (that is, non-active characters). In the nameplate 1014, the name 602 of each of the player characters is displayed.

Figure 13:
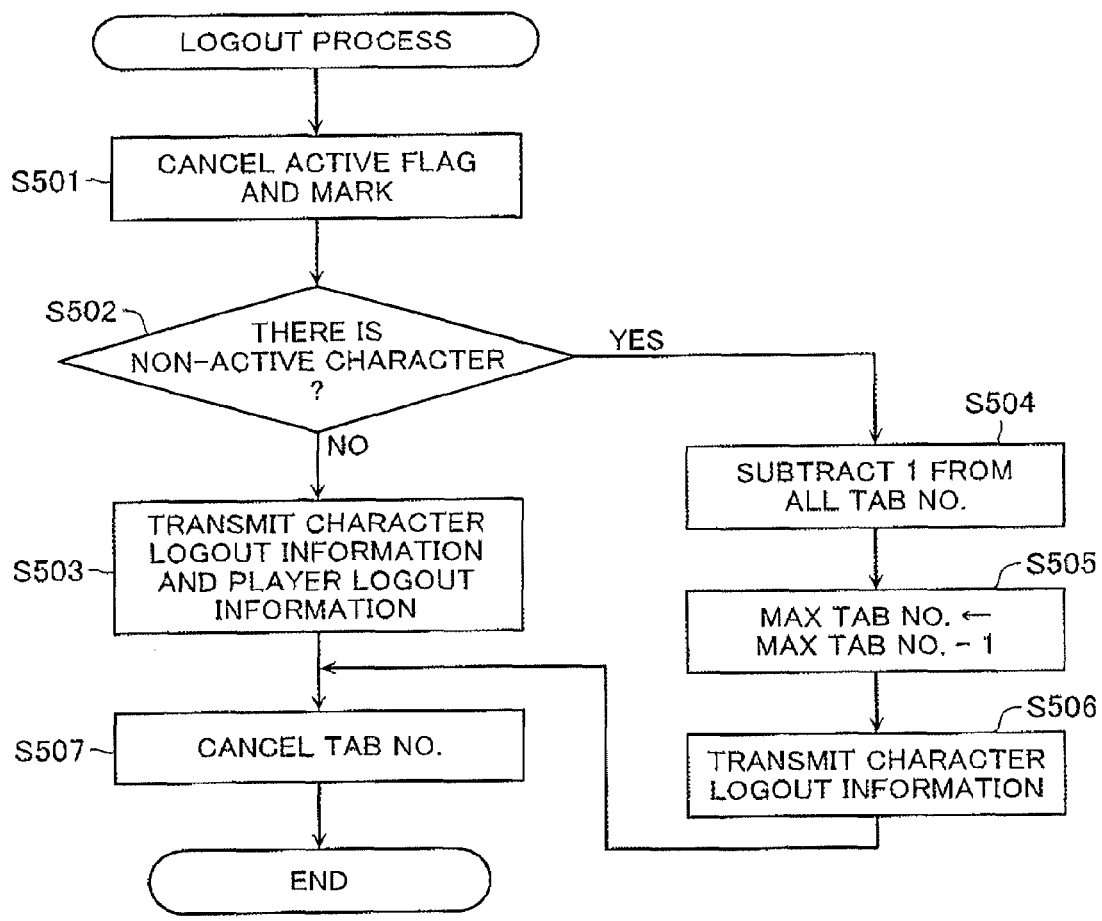
FIG. 13 is a flowchart that shows the logout process of FIG. 9 in detail.

FIG. 13 is a flowchart that shows the logout process executed at Step S124 of FIG. 9 in detail. In the logout process, the control, section 103 of the video game apparatus 100 resets the active flag 607 of the character table 600 for the player character set as the active character 300, and deletes the mark 609 (Step S501). Namely, the control section 103 deletes the mark 609 set for the player character from the map display section 1010.

The control section 103 determines whether or not there are character data in which the tab number 608 is registered to the character table 600, whereby the control section 103 determines whether or not any non-active character is set (Step S502). Here, in the case where there is one player character that is in a character login state, it is determined that no non-active character is set.

In the case where it is determined that no non-active character is set, the player character that participates in the game at this moment (that is, the player character that is in the character login state) among the created player characters of the player is only one player character. The control section 103 resets the active flag 607 set to the character table 600 for the player character. The control, section 103 then transmits the logout information of the player character that executes logout and the logout information of the player from the communications interface 115 to the game server apparatus 200 (Step S503). The processing flow then proceeds to a process at Step S507.

On the other hand, in the case where it is determined that one or more non-active character is set, one or more player character (that is, the player character that is in the character login state), which participates in the game at this moment among the created player characters of the player exists other than the player character that executes logout. The control section 103 subtracts "1" from the tab number 608 of the character table 600 for all of the player characters whose tab number 608 larger than tab number 608 of the player character that executes the logout is registered in the character table 600 (Step S504). The control section 103 also subtracts "1" from the MAX tab number, and sets the calculation result as a new MAX tab number (Step S505).

The control section 103 transmits the logout information on the player character that executes the logout from the communications interface 115 to the game server apparatus 200 (Step S506). The processing flow then proceeds to a process at Step S507.

At Step S507, the control section 103 deletes the tab number 608 of the character table 600 for the player character that executes the logout, and deletes the name 602 and the mark 609 set for the player character that executes the logout from the tab 1011. The control section 103 then terminates the logout process to return to the processes in the flowchart of FIG. 9.

As explained above, in the network game system according to the present embodiment, one player utilizing the video game apparatus 100 can cause a plurality of player characters to participate in the game through the login process. Thus, a plurality of player characters caused to log in by a plurality of players exist in the virtual three-dimensional space. The player utilizing the video game apparatus 100 can set one of the player characters caused to log in as the active character 300. The player can switch the active character 300 between the plurality of player characters in one video game apparatus 100 to operate the active character 300.

Further, a field of view range displayed in the game screen 1009 on the display screen 122 in the video game apparatus 100 utilized by each player is determined in accordance with positional information of the active character 300 set by the player. In the field of view range, the player characters of the player and other player characters of other players may exist together. In the video game apparatus 100 to which the network game system of the present embodiment is applied, in the game screen 1009, the player characters of the player that is not set to active currently (that is, non-active characters) are displayed so that the name plate 1014 is attached to each of the non-active characters. The player can distinguish the non-active character of the player from other characters using the name plate 1014.

Moreover, the direction of the visual axis 304 of the virtual camera 301 is constantly set so as to always face the reference point of the active character 300. The position of the viewpoint 303 is kept at a position of a constant distance from the active character 300 in a predetermined direction, and moves so as to follow the active character 300. Thus, the active character 300 is always displayed in the center of the game screen 1009. The player can distinguish the active character 300 from other characters with the display position in the game screen 1009.

Thus, by the contents displayed in the game screen 1009 of the virtual three-dimensional space common to all of the player characters (including presence or absence of the name plate 1014, and the display position in the game screen 1009), the player can distinguish the active character 300 or the non-active character of the player from player characters of other players for all of the characters displayed in the game screen 1009. This makes it possible to cause the game to proceed smoothly.

Furthermore, only the active character 300 is operated among the player characters that are in a login state by means of an operation of the input section 161. Since the active character 300 is always displayed in the center of the game screen 1009, the player can operate the active character 300 without confusion of player characters to be operated. In particular, since the center of the game screen 1009 is a visible position for the player, operability of the player can be improved. In addition, since the distance between the active character 300 and the viewpoint 303 is always kept at a constant distance, the active character 300 is always displayed with a substantially same size in the game screen 1009. This makes it possible to keep visibility constant.

Further, a tab 1011 set for each of the player characters that are in a login state is displayed in the display screen 122. By making a click on any tab 1011 other than the tab 1011 corresponding to the player character set as the active character 300 at this moment the player can set the player character corresponding to the clicked tab 1011 as a new active character 300.

When the active character 300 is switched due to the click of the tab 1011, the contents displayed in the game screen 1009 are to be switched to the image corresponding to the active character 300. The player can determine the active character 300 and non-active characters of the player and other player characters of other players using the screen position (center) of the active character 300 in the game screen 1009 after switching, the name displayed in the name plate 1014 of the game screen 1009 and the name displayed in the tab 1011. Thus, the player does not confuse the operation in the game screen 1009 after switching.

Moreover, the form of the player character is identified in combination with tools prepared for the respective sites configuring the player character (for example, an outline, a hair style, an eyebrow, eyes, a nose, a mouth and the like). The difference of such a form occurs only due to the difference of combination of selected tools. Thus, in the virtual three-dimensional space, the player character having the substantially same form as that of the player character of the player may exist so that part of tool selection is different from each other. Further, the player character having the form identical to the player character of the player may exist. Even in such a case, by the contents displayed in the game screen 1009 (including presence or absence of the name plate 1014, and the display position in the game screen 1009), the player can distinguish the active character 300 or the non-active character of the player from player characters of other players for all of the characters displayed in the game screen 1009. This makes it possible to cause the game to proceed smoothly.

Furthermore, in the video game apparatus 100 utilized by each player, the information on the player character registered by the player is also managed in the character table 600 of the video game apparatus 100. Since the information on the active character 300 always displayed in the game screen 1009 is managed even in the video game apparatus 100 in this manner, the smaller amount of information of the visible range information transmitted every ¹⁄₁₅ seconds by the game server apparatus 200 is required. This makes it possible to reduce a processing load of the game server apparatus 200.

Further, in the game server apparatus 200, the character management table 500 is provided for every player ID, and the information on the registered player character of the player ID is managed. Here, in the game server apparatus 200, since the positional information of the active character 300 (character position 504) is managed, the visible range can be specified. Further, in the game server apparatus 200, since the positional information of the player characters for all of the players (character position 504) is also managed, the player character(s) included in the visible range can be specified.

Moreover, each player utilizing the video game apparatus 100 can create up to four player characters, and select a plurality of player characters to be caused to log in the game from the plurality of created player characters. Since the player can arbitrary determine the number of player characters caused to participate in the game in the range of 1 to 4, it is possible to enhance flexibility of the game. Further, the player characters are in turn caused to log in the game one by one, and the player character caused to finally log in becomes the active character 300 until next switching. Thus, the player can determine the player character newly caused to log in the game as the active character 300 readily.

Furthermore, the position of the player character that is in a login state of the field is shown in the map display section 1010 with a mark set to the player character. Thus, the player can grasp a positional relationship between the player characters caused to log in the game using the map display section 1010 showing a range wider than the range (perspective range) displayed in the game screen 1009.

Further, by clicking the map display section 1010, the display thereof can be canceled out or the display size thereof can be changed (enlarged or reduced). Since the player is allowed to select the display of the map display section 1010 that is additional information in this manner, visibility of the game screen 1009 showing the field on which the player characters exist is hardly reduced.

The present invention is not limited to the embodiment described above, and various changes and applications can be made in the present invention. Variation of the embodiment described above that can be applied to the present invention will now be described.

In the embodiment descried above, the player cannot create a player character during the game or at the game restart. On the other hand, the player may create a player character even during the game or at the game restart. In this case, a predetermined condition to allow the player to create a player character may be provided.

In the embodiment descried above, each player utilizing the video game apparatus 100 can uniformly create up to four player characters, and register them in the game server apparatus 200. On the other hand, the number of player characters that each player can create is not limited thereto so long as the number is an arbitrary number more than one. Further, in the case where the player can create a player character during the game (including the case at the game restart), the number of player characters that each player can create may not be uniform to all of the players.

In the embodiment descried above, each player utilizing the video game apparatus 100 can uniformly cause all of the player characters among the plurality of created player characters (in the present embodiment, up to four) to participate in the game (that is, to become a character login state) at the same time. On the other hand, the number of player characters that can become a character login state at the same time may be set to a predetermined number equal to or less than the number of created player character, or a predetermined lamination may be provided. Further, the number of player characters that each player can set to be a character login state may not be uniform to all of the players.

In the embodiment descried above, each player utilizing the video game apparatus 100 cannot move the plurality of player characters on the field at the same time. On the other hand, by means of a predetermined setup (group setting or the like) the plurality of player characters may be moved on the field at the same time by the player. In this case, one player character is determined as a leader of the group, and the other player characters belonging to the same group may follow the action of the leader player character. In this regard, the group may be constructed from the player characters of the player, or may be constructed from the player characters of the player and other player characters of other players.

In each case, the leader of the group is required to be the active character 300. In the case where the group is formed by only the player characters of the player, the leader of the group may be switched in accordance with switch of the active character 300. In this case, the player can move the non-active characters belonging to the group on the field on the basis of only operations for the active character 300. In the game screen 1009, the active character 300 and the non-active characters belonging to the group are always displayed.

On the other hand, the player characters of the player belonging to the group whose leader is a player character of other player are moved on the field without operations of the player. Here, the position of the player characters of the player is determined in accordance with positional information of the player character of other player that is the leader. Although only a non-active character can belong to the group whose leader is a player character of other player, the non-active character may leave from the belonging group when the non-active character is set to the active character 300. Moreover, when the player character of other player that is the leader of the group becomes no active character, the setting of the group is released. Here, the player can move the non-active character on the field without his or her own operations.

In the embodiment descried above, once the form of the player character is registered in the game server apparatus 200, the form is not changed with progress process of the game (during the game and at the game restart). On the other hand, the form of the player character may be changed with progress process of the game. Here, a change in the form of the player character may be automatically executed, or may be executed by selection of the player. In this case, when the form is changed, information indicating the fact may be transmitted from the video game apparatus 100, and the character form 503 registered in the character management table 500 of the game server apparatus 200 may be updated.

In the embodiment described above, in the case where the player character is caused to log in the game, the player character is arranged at a predetermined position on the field formed in the virtual three-dimensional space (for example, the position where logout is previously executed, or the initial position). Therefore, the player cannot recognize whether the player character of other player displayed in the tame screen 1009 is the active character 300 or not. On the other hand, whether the player character of other player is the active character 300 or not may be indicated in the virtual three-dimensional space.

For example, the player characters other than the active character 300 (non-active character) of other player may be changed with transparency and/or a color, or may be displayed with a semitransparent or monochrome color in the game screen 1009. In this case, the player can readily determine whether the player character is the active character 300 or not on the basis of the difference of transparency or color of the player character displayed in the game screen 1009.

In the embodiment descried above, in the case where any action is executed against the non-active character, the fact cannot be informed of the player, in particular. In the case where any action is executed against the non-active character (for example, the case where a player character of other player talks to the non-active character), the fact may be displayed in the display screen 122. For example, in the case where an "AAA" character and a "BBB" character become a login state and the "AAA" character is set as the active character 300, the player views the image of the virtual three-dimensional space in which the "AAA" character acts as the active character 300, and causes the game to proceed. Here, in the case where a player character of other player talks to the "BBB" character, the tab 1011 set to the "BBB" character may be caused to blink. In this case, the player can grasp information on the player character of other player that is in a login state while causing the game to proceed with respect to the one player character.

Further, in the case where any action is executed against the non-active character (for example, the case where a player character of other player talks to the non-active character), information indicating the fact may be transmitted from the game server apparatus 200 to the video game apparatus 100, the non-active character may be automatically set as the active character 300. In this case, by switching the active character 300 automatically, the game screen 1009 is displayed in accordance with the player character against which the action is executed on the display screen 122. The player can grasp the fact that the action has been executed. For this reason, since the player can respond to this action immediately, the player can cause the game to proceed smoothly.

In this regard, in the case where the information on the action against the non-active character that is to be transmitted from the game server apparatus 200 to the video game apparatus 100 is information capable of specifying that each of the player characters caused to log in the game by the player of the video game apparatus 100 is the active character 300 or the non-active character by means of the visible range information, the information can be the visible range information.

In the embodiment descried above, by making a click on the tab 1011 for each of the player characters displayed on the display screen 122, the player can switch the player character corresponding to the tab 1011 to the active character 300. By making a click on a NEW tab, the player can set a new player character caused to log in the game. On the other hand, the switching of the active character 300 and the setup for the new player character caused to log in the game may be assigned to the plurality of operational buttons (or function keys of the keyboard) provided in the input section 161. In this case, the player can change the active character 300 and set up the new player character caused to log in the game with a relatively simple operation of the input section 161.

Further, by making a click on the mark displayed in the map display section 1010, the player may set the player character corresponding to the mark as the active character 300. Alternatively, in the case where the non-active character displayed in the game screen 1009 exists, by making a click on the non-active character in the game screen 1009, the player may set the non-active character as the active character 300. In the case of the former, the player can change the active character 300 with a relatively simple operation while grasping the position of the player character that is in a login state on the field. In the case of the latter, the player can change the active character 300 by means of a direct operation that is the click on the non-active character displayed in the game screen 1009.

In the embodiment descried above, by clicking the map display section 1010, the display of the map display section 1010 can be canceled out or the display size of the map display section 1010 can be changed (enlarged or reduced). On the other hand, the display state of the map display section 1010 changed by an operation of the player is not limited thereto. For example, transparency of the map display section 1010 may be changed. Further, the map display section 1010 may be displayed when the cursor 1005 is attached to the tab 1011.

In the embodiment descried above, on creating the player character, the player selects tools constituting the form of the player character from the plurality of tools prepared for the respective sites and displayed in the creation tool selecting display frame 1001. On the other hand, a method of creating a player character may be other method so long as it is executed by selecting data registered in advance. For example, only appearance of the player character is determined in advance, the player may create the player character by specifying a color for the appearance of the player character. Further, by drawing lots with roulette or the like for each site in response to an operation of the player, selection of parts is decided, whereby the form of the player character may be determined. Moreover, by drawing lots with roulette or the like for each site in response to an operation of the player, any one of the plurality of player characters may be determined as the payer character.

Further, the player character may be determined in the game server apparatus 200 in response to an instruction from the video game apparatus 100. For example, by drawing lots in response to reception of information from the player after the player gets user registration, any one of the plurality of player characters created in advance may be determined as the player character of the player. Furthermore, all of the player characters of the player or other players may have the identical form (however, it does not obstruct occurrence of a difference due to parameters). Further, the player character may be exchanged between players.

In the embodiment descried above, by attaching the name plate 1014 to each of non-active characters of the player in the game screen 1009, the non-active characters of the player are distinguished from the player characters of other player. On the other hand, the player is caused to distinguish whether the player character is the non-active character of the player or not by other method. For example, although the name plate 1014 is attached to each of all of the player characters, the colors of the name plate 1014 attached to the active character 300 and the non-active character may be differentiated from the color of the name plate 1014 attached to the player character of other player. Alternatively, although the name plate 1014 is attached to all of the player characters other than the active character 300, the color of the name plate 1014 attached to the non-active character of the player may be differentiated from the color of the name plate 1014 attached to the player character of other player.

Further, the player may be caused to distinguish whether or not the player character is the non-active character of the player with something other than the name plate 1014. For example, a mark "!" may be attached above the head of the active character 300 of the player, and a mark "! !" may be attached above the head of the non-active character of the player. Further, transparency or a color of the non-active character of the player may be changed, or it may be displayed with a semitransparent or monochrome color in the game space 1011. In this case, the player can readily determine whether the player character is the non-active character of the player on the basis of the difference of transparency or the color of the player character displayed in the game screen 1009. So long as the active character 300 of the player can be distinguished from other player characters (including the non-active character of the player) by means of such a technique, the active character 300 may not necessarily be displayed in the center of the game screen 1009.

Furthermore, by displaying part of the detailed information (for example, parameters) for only the player character of the player on the display screen 122, the player character of the player can be distinguished from the player character of other player. For example, in the case where a parameter such as can HP (which is an ability value indicating the value at which each player character can survive in the game space, and normally, the game cannot be continued when this value becomes zero) to be changed in accordance with progress of the game is displayed on the display screen 122, the player causes the game to proceed while grasping the state of the HP set to the player character of the player, whereby the game can proceed smoothly.

Here, on progress process of the game, the game includes a battle between the active character 300 and an enemy character (that is a character operating by control of the game server apparatus 200 (non-player character), or the player character of other player). The value of a parameter set to each of the player characters may be increased or decreased in accordance with progress of the battle. In this case, even in the case where a battle is executed on the progress process of the game, the player can grasp the state of the HP set to each of the player characters of the player. Here, the player can cause the game to proceed strategically by switching the active character 300 while referring to the HP of each player character.

In the embodiment descried above, the position of the viewpoint 303 is kept at the position of the constant distance from the active character 300, and it moves so as to follow the active character 300. Further, the direction of the visual axis 304 is constantly set so as to always face the reference point of the active character 300, and the magnitude of the visual angle 305 and the clipping distance are basically set to the same magnitude. They are not limited thereto. The setup of the virtual camera is arbitrary so long as the active character 300 can be distinguished form other player character (including the player character of other player) and the screen in which no problem occurs on progress of the game is displayed.

In the embodiment descried above, the image displayed in the game screen 1009 is generated by being perspectively transformed from the position of the viewpoint 303 of the virtual camera 301 that is positioned at the position different from that of the active character 300. It is not limited to the image generated by perspective transformation from such a viewpoint position. For example, the viewpoint 303 of the virtual camera 301 may be a first-person viewpoint of the player character (active character 300). In this case, the viewpoint 303 of the virtual camera 301 is uniquely determined with the position of eyes of the active character 300. The direction of the visual axis 304 is determined with the direction of the face of the active character 300. In this regard, an area of the visual field is fixed. Here, the image by the first-person viewpoint of the active character 300 is displayed in the game screen 1009, whereby it is possible to improve realism (realistic sensation) of the game. Further, a part of the form of the active character 300 such as a hand or a foot is displayed in the game screen 1009 in accordance with the action of the active character 300. Thus, the player can cause the game to proceed at the viewpoint of the active character 300 while grasping the form of the active character 300.

In the embodiment descried above, the player characters executing the login are displayed in the display screen 122 so that the tabs 1011 are in turn arranged from right to left. The display position and alignment order of the tabs 1011 on the display screen 122 are not limited thereto. For example, the display position and alignment order of the tabs 1011, on the display screen 122 may be changed by means of an input from input section 161, by the player. Further, either the display position or the alignment order may be changed. In this case, the player can arrange the display position and the alignment order of the input in response to the change of the active character 300 on the display screen 122 at the places where the player easily operates them. This makes it possible to improve operability of the player.

In the embodiment descried above, in order for the character to log in the game, it is first required to execute the login process of the player. On the other hand, the login method of the player characters is not limited thereto. For example, a password may be prepared for each player character, and the character login process may be executed using the character ID (or the name of the player character) and the password.

In the embodiment descried above, the login of the player character is executed for each player character on the character selecting screen. However, a plurality of player characters may be specified at the same time to execute the login. In this case, after selecting the plurality of player characters caused to log in the game, the active character 300 may be specified by the player. Further, immediately after the login, the player character meeting a predetermined condition (for example, finally selected among the plurality of player characters to be caused to log in the game) may be specified as the active character 300. By specifying the player character finally selected as the active character 300 immediately after the login, the player can determine the active character 300 readily.

In the embodiment descried above, the visible range information received from the game server apparatus 200 does not specify whether or not the player character included in the field of view range is any player character (the active character 300, the non-active character, the player characters of other player). On the other hand, in the game server apparatus 200, the player character included in server field of view range may be specified as any player character (the active character 300, the non-active character, the player characters of other player). In this case, in the video game apparatus 100, it is possible to prevent an iniquity process from being executed.

In the embodiment descried above, in the game server apparatus 200, the visible range is specified in accordance with positional information (character position 504) of the active character 300 (that is, the player character whose active flag 507 is set in the character management table 500) in each video game apparatus 100. On the other hand, the visible range may be specified in the video game apparatus 100, and the specified visible range may be transmitted together with the positional information to the game server apparatus 200. Here, by operations of the input section 161 by the player, the range in which the image is generated by the perspective transformation in the virtual three-dimensional space (that is, visible range) can be changed.

In the embodiment descried above, in the video game apparatus 100, in the case where the instruction to move the player character on the field is inputted by means of an operation of the directional key, the position of the player character (that is, the active character 300) is moved on the field in accordance with the instruction. The character positional information 604 after the movement is transmitted to the game server apparatus 200. On the other hand, in the video game apparatus 100, in the case where the instruction to move the player character on the field is inputted by means of an operation of the directional key, the inputted information may be transmitted to the game server apparatus 200. In this case, in the game server apparatus 200, the active character 300 is moved on the field in accordance with the received inputted information, and the character position 504 registered in the character management table 500 may be updated. Then, the visible range information specified by the new character position 504 and the positional information of the player character after the movement are transmitted to the video game apparatus 100.

In the embodiment descried above, the network game is executed in the virtual three-dimensional space. On the other hand, the present invention can also be applied to a network game executed in the two-dimensional space. In this case, the visible range information can be set to a predetermined range on the field so that the reference point of the active character 300 is centered.

In the embodiment descried above, the dedicated video game apparatus main body 101 is applied as a platform to execute the video game. On the other hand, a general-purpose personal computer or the like may be applied so long as the personal computer includes components similar to the video game apparatus main body 101 and has a function to draw an image. A mobile game apparatus that has the configuration in which the display device 121 and the sound output device 125 are enclosed in the same package as the video game apparatus main body 101 may be applied. In addition to a game such as a server-client type network game, the present invention can be applied to a peer-to-peer type network game in which a plurality of video game apparatuses are mutually connected to each other without a server on the network 151 and a plurality of players play the game.

As the storage medium 131, a semiconductor memory card can be applied in place of a DVD-ROM or a CD-ROM. A card slot for insertion of the memory card can be provided in place of the DVD/CD-ROM drive 113. In the case of a general-purpose personal computer, the programs and data according to the present invention are not presented so as to be stored in the storage medium 131, but they may be presented so as to be installed in the HDD 107. A storage medium for storing and presenting the programs and data according to the present invention can be applied to arbitrary ones in accordance with a physical configuration of hardware and a form of distribution.

In the embodiment descried above, the programs and data of the video game apparatus 100 are stored in the storage medium 131 and distributed. On the other hand, these programs and data may be stored in a fixed disk drive of the server apparatus that exists on the network 151, and they may be delivered to the video game apparatus main body 101 via the network 151. In the video game apparatus 100, the programs and data received from the server apparatus through the communications interface 115 can be stored in the HDD 107, and be loaded in the RAM 105 at the execution of the game.

What is claimed is:

1. A network game system comprising a server apparatus and a plurality of terminal apparatuses connected to the server apparatus via a network, each of the plurality of terminal apparatuses operated by a player for allowing a plurality of player characters to participate in a network game, each of the plurality of player characters controlled by the player and existing in a common virtual space, wherein each of the plurality of terminal apparatuses comprises:

a character login processor that logs each of the plurality of player characters into the network game and displays a tab for each player character on a display device in response to the player character being logged into the network game;

an active character controller that controls a first character of the plurality of player characters as an active character that is activated among the plurality of player characters during a progress of the network game;

an active character switcher that switches the active character during the progress of the network game from the first character to a second character of the plurality of player characters different than the first character in accordance with a first operation of the player of the terminal apparatus, the player causing the plurality of player characters to participate in the network game;

an active character information transmitter that transmits active character information to the server apparatus via the network, the active character information specifying the active character switched by the active character switcher and non-active characters, the non-active characters including the plurality of player characters other than the active character;

a movement instruction input controller that inputs a movement instruction in accordance with a second operation of the player, the movement instruction being used to move the active character switched by the active character switcher in the virtual space;

a movement information transmitter that transmits movement information to the server apparatus via the network, the movement information corresponding to the movement instruction inputted by the movement instruction input controller to the server apparatus via the network;

a visible range information receiver that receives visible range information transmitted from the server apparatus via the network, the visible range information specifying each of the plurality of player characters that exists in a visible range, the visible range being set to a predetermined range of the virtual space within a range displayed on the display device with which the terminal apparatus is provided, at least the active character being included in the visible range of the virtual space; and a display controller that causes the display device to display the visible range, each of the plurality of player characters specified by the visible range information received by the visible range information receiver being arranged in the visible range, and wherein the server apparatus comprises:

an active character information receiver that receives the active character information transmitted by the active character information transmitter of each of the plurality of terminal apparatuses;

an active character manager that manages the active character switched from among the plurality of player characters on the basis of the active character information received from each of the plurality of terminal apparatuses by the active character information receiver;

a movement information receiver that receives the movement information transmitted by the movement information transmitter of each of the plurality of terminal apparatuses;

a character position manager that manages a position of each of the plurality of player characters on the basis of the movement information received by the movement information receiver;

a visible range specifier that specifies the visible range information for each of the plurality of terminal apparatuses, the visible range information, for each of the plurality of terminal apparatuses, including the position managed by the character position manager for the active character; and a visible range information transmitter that transmits the visible range information to each of the plurality of terminal apparatuses via the network, the visible range information, for each of the plurality of terminal apparatuses, including the position of each of the plurality of player characters that exists in the visible range, wherein the display controller of each of the plurality of terminal apparatuses causes the display device to display the visible range in which each of the plurality of player characters specified by the visible range information is arranged so that each of the plurality of player characters that exists in the visible range is distinguished from other player characters, controlled by other players, which exist in the visible range, and so that the active character is distinguished from the non-active characters that exist in the visible range, wherein the first operation includes a selection of the tab of the second character by the player during the progress of the video game, and wherein the active character controller controls one of the plurality of player characters that is finally logged into the network game as the first character until the active character switcher switches the first character to the second character in accordance with the first operation.

2. The network game system according to claim 1, wherein the display controller of each of the plurality of terminal apparatuses causes the display device to display the active character in the center of a display screen of the display device so that the active player character is distinguished from the non-active characters on the basis of a difference of display positions on the display screen.

3. The network game system according to claim 2, wherein the virtual space is a virtual three-dimensional space, wherein the display controller of each of the plurality of terminal apparatuses includes a perspective transformer that generates a two-dimensional image by projecting each of the plurality of player characters that exists in the virtual three-dimensional space onto a virtual screen by a virtual camera while directing a visual axis of the virtual camera to the active character switched by the active character switcher, a viewpoint of the virtual camera is positioned at a predetermined position of the virtual three-dimensional space, and the display controller causes the display device to display the two-dimensional image generated by the perspective transformer, and wherein the visible range is a range projected onto the virtual screen in the virtual three-dimensional space by the perspective transformer.

4. The network game system according to claim 3, wherein the viewpoint of the virtual camera is uniquely determined in accordance with the movement instruction of the active character in the virtual three-dimensional space.

5. The network game system according to claim 1, wherein the virtual space is a virtual three-dimensional space, wherein the display controller of each of the plurality of terminal apparatuses includes a perspective transformer that generates a two-dimensional image by projecting the other player characters that exist in the virtual three-dimensional space onto a virtual screen by a virtual camera, a viewpoint of the virtual camera is positioned at a position of an eye of the active character in the virtual three-dimensional space, and the display controller causes the display device to display the two-dimensional image generated by the perspective transformer and to display a part of the active character in accordance with a direction of a visual axis, and wherein the visible range is a range projected onto the virtual screen in the virtual three-dimensional space by the perspective transformer.

6. The network game system according to claim 1, wherein each of the plurality of player characters is configured by a combination of parts, and the parts are respectively selected for sites from a plurality of parts prepared for the sites.

7. The network game system according to claim 1, wherein each of the plurality of terminal apparatuses further comprises a position map display controller that causes the display device to display a character position map, and the character position map indicates a position of each of the plurality of player characters in a range of the virtual space wider than the visible range.

8. The network game system according to claim 7, wherein each of the plurality of terminal apparatuses further comprises a position map display selector that selects whether the position map display controller causes the display device to display the character position map in accordance with a third operation of the player.

9. The network game system according to claim 1, wherein each of the plurality of terminal apparatuses further comprises a terminal character manager that manages the plurality of player characters for distinguishing the active character from the non-active characters, and wherein the display controller of each of the plurality of terminal apparatuses specifies whether each of the plurality of player characters is specified by the visible range information on the basis of information managed by the terminal character manager, specifies whether each of the plurality of player characters is the active character or one of the non-active characters, and causes the display device to display the plurality of player characters so that player characters of the plurality of player characters that exist in the visible range are distinguished from the other player characters, controlled by the other players, which exist in the visible range, and so that the active player character is distinguished from the non-active characters that exist in the visible range.

10. The network game system according to claim 1, wherein the visible range information specifies whether each character that exists in the visible range is one of the plurality of player characters controlled by the player, and specifies whether each of the plurality of player characters that exists in the visible range is the active character or one of the non-active characters, and wherein the display controller of each of the plurality of terminal apparatuses specifies, on the basis of the visible range information, whether each character included in the visible range information is one of the plurality of player characters, specifies whether each of the plurality of player characters that exists in the visible range is the active character or one of the non-active characters, and causes the display device to display the plurality of player characters so that player characters of the plurality of player characters that exist in the visible range are distinguished from the other player characters, controlled by the other players, which exist in the visible range, and so that the active player character is distinguished from the non-active characters that exist in the visible range.

11. The network game system according to claim 1, wherein the active character switcher of each of the plurality of terminal apparatuses includes a display position input controller that receives an inputted position on a display screen of the display device in accordance with the first operation of the player, and selects one of the plurality of player characters displayed at the inputted position as the active character when one of the plurality of player characters exists at the inputted position on the display screen received by the display position input controller.

12. The network game system according to claim 1, wherein the character position manager includes a following movement controller that causes each of the non-active characters that have a predetermined relationship with the active character to move in the virtual space so as to follow a movement of the active character when the active character is caused to move in the virtual space in accordance with the movement information received by the movement information receiver.

13. The network game system according to claim 12, wherein the non-active characters that are caused to move so as to follow the movement of the active character by the following movement controller include other non-active characters of other players than the player of the active character.

14. The network game system according to claim 1, wherein each of the plurality of terminal apparatuses further comprises a participation character selector that selects at least one selected player character to participate in the network game from among the plurality of player characters in accordance with a third operation of the player, wherein the active character selector selects the active character from among the at least one selected player character selected by the participation character selector, and wherein the active character information transmitter transmits the active character information that specifies the active character and the non-active characters from among the at least one selected player character selected by the participation character selector.

15. The network game system according to claim 14, wherein the participation character selector in turn selects the at least one selected player character one by one from among the plurality of player characters in accordance with the third operation of the player, and wherein, when a new player character is selected as the at least one selected player character, the active character selector selects the new player character as the active character until an other of the at least one selected player character is selected as the active character in accordance with the first operation of the player.

16. The network game system according to claim 1, wherein the server apparatus further comprises:

a non-active action controller that executes a predetermined action against one of the non-active characters;

an active character transformer that sets the one of the non-active characters subjected to the predetermined action as the active character when the predetermined action is executed against the one of the non-active characters by the non-active action controller, sets the active character as one of the non-active characters, and causes the active character manager to set the one of the non-active characters as the active character; and an active character transforming information transmitter that transmits active character transforming information to one of the plurality of terminal apparatuses, the active character transforming information specifying the active character newly set when the one of the non-active characters is set as the active character by the active character transformer, wherein each of the plurality of terminal apparatuses further comprises:

an active character transforming information receiver that receives the active character transforming information transmitted by the active character transforming transmitter, and wherein the display controller of each of the plurality of terminal apparatuses causes the display device to distinguishably display the active character and the non-active characters in accordance with the received active character transforming information when the active character transforming information receiver receives the active character transforming information.

17. The network game system according to claim 1, wherein a predetermined parameter is set to each of the plurality of player characters, and a state of the predetermined parameter is changed in accordance with progress of the network game, and wherein the display controller of each of the plurality of terminal apparatuses causes the display device to display each of the plurality of player characters that exists in the visible range so as to attach the predetermined parameter thereto, and to display the other player characters, controlled by the other players, so as not to attach the predetermined parameter thereto.

18. The network game system according to claim 17, wherein the network game includes at least a process for executing a first battle between the active character and an enemy character other than the active character, and a second battle between a new active character and the enemy character when the new active character is newly selected by the active character selector during the first battle, and wherein the predetermined parameter is a parameter whose value is increased and decreased in accordance with progress of the first battle and the second battle.

19. The network game system according to claim 1, wherein the display controller of each of the plurality of terminal apparatuses causes the display device to display the active character with a display state different from display states of the non-active characters.

20. A terminal apparatus for executing a network game, the terminal apparatus being connected to a server apparatus via a network, the terminal apparatus operated by the player for allowing a plurality of player characters to participate in the network game, the plurality of player characters controlled by the player and existing in a common virtual space, the terminal apparatus comprising:

a character login processor that logs each of the plurality of player characters into the network game and displays a tab for each player character on a display device in response to the player character being logged into the network game;

an active character controller that controls a first character of the plurality of player characters as an active character that is activated among the plurality of player characters during a progress of the network game;

an active character switcher that switches the active character during the progress of the network game from the first character to a second character of the plurality of player characters different than the first character in accordance with a first operation of the player of the terminal apparatus, the player causing the plurality of player characters to participate in the network game;

an active character information transmitter that transmits active character information to the server apparatus via the network, the active character information specifying the active character switched by the active character switcher and non-active characters, the non-active characters including the plurality of player characters other than the active character;

a movement instruction input controller that inputs a movement instruction in accordance with a second operation of the player, the movement instruction being used to move the active character switched by the active character switcher in the virtual space;

a movement information transmitter that transmits movement information to the server apparatus via the network, the movement information corresponding to the movement instruction inputted by the movement instruction input controller;

a visible range information receiver that receives visible range information transmitted by the server apparatus via the network in accordance with the information transmitted by each of the active character information transmitter and the movement information transmitter, the visible range information specifying each of the plurality of player characters that exists in a visible range, the visible range being set to a predetermined range of the virtual space within a range displayed on the display device with which the terminal apparatus is provided, at least the active character being included in the visible range of the virtual space; and a display controller that causes the display device to display the visible range, each of the plurality of player characters specified by the visible range information received by the visible range information receiver being arranged in the visible range, wherein the display controller causes the display device to display the visible range in which each of the plurality of player characters specified by the visible range information is arranged so that each of the plurality of player characters that exists in the visible range is distinguished from other player characters, controlled by other players, which exist in the visible range, and so that the active character is distinguished from the non-active characters that exist in the visible range, wherein the first operation includes a selection of the tab of the second character by the player during the progress of the video game, and wherein the active character controller controls one of the plurality of player characters that is finally logged into the network game as the first character until the active character switcher switches the first character to the second character in accordance with the first operation.

21. A method of displaying a game screen on a display device of each of a plurality of terminal apparatuses to execute a network game in a network game system, in the network game system the plurality of terminal apparatuses being connected to a server apparatus via a network, each of the plurality of terminal apparatuses operated by a player for allowing a plurality of player characters to participate in the network game, each of the plurality of player characters controlled by the player and existing in a common virtual space, the method comprising, by each of the plurality of terminal apparatuses:

logging each of the plurality of player characters into the network game and displaying tab for each player character on the display device in response to the player character being logged into the network game;

controlling a first character of the plurality of player characters as an active character that is activated among the plurality of player characters during a progress of the network game;

switching the active character during the progress of the network game from the first character to a second character of the plurality of player characters different than the first character in accordance with a first operation of an input controller by the player, the player causing the plurality of player characters to participate in the network game;

transmitting active character information to the server apparatus via the network using a communication interface, the active character information specifying the active character and non-active characters, the non-active characters including the plurality of player characters other than the active character;

inputting a movement instruction in accordance with a second operation of the input controller by the player, the movement instruction being used to move the active character in the virtual space;

transmitting movement information to the server apparatus via the network using the communication interface, the movement information corresponding to the inputted movement instruction;

receiving visible range information transmitted by the server apparatus via the network in accordance with the active character information and the movement information, the visible range information specifying each of the plurality of player characters that exists in a visible range, the visible range being set to a predetermined range of the virtual space within a range displayed on the display device, at least the active character being included in the visible range of the virtual space; and causing the display device to display the visible range in which each of the plurality of player characters specified by the visible range information is arranged so that each of the plurality of player characters that exists in the visible range is distinguished from other player characters, controlled by other players, which exist in the visible range, and so that the active character is distinguished from the non-active characters that exist in the visible range, wherein the first operation includes a selection of the tab of the second character with the input controller by the player during the progress of the video game, and wherein the active character controller controls one of the plurality of player characters that is finally logged into the network game as the first character until the active character switcher switches the first character to the second character in accordance with the first operation.

22. A non-transitory computer-readable medium including a computer program product for displaying a game screen on a display device of each of a plurality of terminal apparatuses to execute a network game in a network game system, in the network game system the plurality of terminal apparatuses being connected to a server apparatus via a network, each of the plurality of terminal apparatuses operated by a player for allowing a plurality of player characters to participate in the network game, each of the plurality of player characters controlled by the player and existing in a common virtual space, the computer program product causing each of the plurality of terminal apparatuses to execute:

logging each of the plurality of player characters into the network game and displaying tab for each player character on the display device in response to the player character being logged into the network game;

controlling a first character of the plurality of player characters as an active character that is activated among the plurality of player characters during a progress of the network game;

switching the active character during the progress of the network game from the first character to a second character of the plurality of player characters different than the first character in accordance with a first operation of the player, the player causing the plurality of player characters to participate in the network game;

transmitting active character information to the server apparatus via the network using a communication interface, the active character information specifying the active character and non-active characters, the non-active characters including the plurality of player characters other than the active character;

inputting a movement instruction in accordance with a second operation of the player, the movement instruction being used to move the active character in the virtual space;

transmitting movement information to the server apparatus via the network using the communication interface, the movement information corresponding to the inputted movement instruction;

receiving visible range information transmitted by the server apparatus via the network in accordance with the active character information and the movement information, the visible range information specifying each of the plurality of player characters that exists in a visible range, the visible range being set to a predetermined range of the virtual space within a range displayed on the display device, at least the active character being included in the visible range of the virtual space; and causing the display device to display the visible range in which each of the plurality of player characters specified by the visible range information is arranged so that each of the plurality of player characters that exists in the visible range is distinguished from other player characters, controlled by other players, which exist in the visible range, and so that the active character is distinguished from the non-active characters that exist in the visible range, wherein the first operation includes a selection of the tab of the second character by the player during the progress of the video game, and wherein the active character controller controls one of the plurality of player characters that is finally logged into the network game as the first character until the active character switcher switches the first character to the second character in accordance with the first operation.

* * * * *